US010033443B2

(12) United States Patent
Kurchuk

(10) Patent No.: US 10,033,443 B2
(45) Date of Patent: Jul. 24, 2018

(54) MIMO TRANSCEIVER SUITABLE FOR A MASSIVE-MIMO SYSTEM

(71) Applicant: Alcatel-Lucent USA Inc., Murray Hill, NJ (US)

(72) Inventor: Boris A. Kurchuk, Bridgewater, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 113 days.

(21) Appl. No.: 15/130,197

(22) Filed: Apr. 15, 2016

(65) Prior Publication Data
US 2017/0302342 A1 Oct. 19, 2017

(51) Int. Cl.
*H04B 7/04* (2017.01)
*H04J 1/05* (2006.01)
(Continued)

(52) U.S. Cl.
CPC ......... *H04B 7/0452* (2013.01); *H04B 7/0626* (2013.01); *H04J 1/05* (2013.01); *H04J 1/08* (2013.01); *H04W 88/08* (2013.01)

(58) Field of Classification Search
CPC ....... H04B 7/0452; H04B 7/0626; H04J 1/08; H04J 1/05; H04W 88/08
See application file for complete search history.

(56) References Cited

U.S. PATENT DOCUMENTS 5,111,166 A    5/1992  Plonka et al.
5,479,449 A *  12/1995 Patel ...................... H04L 27/02
                                                                375/316
(Continued)

FOREIGN PATENT DOCUMENTS

JP       2006191409 A     7/2006

OTHER PUBLICATIONS

Brannon, B., "Sampled Systems and the Effects of Clock Phase Noise and Jitter," Application Note AN-756 (2004), Analog Devices, Retrieved from: www.analog.com on Mar. 6, 2013, pp. 1-12.

(Continued)

*Primary Examiner* — Brian D Nguyen
(74) *Attorney, Agent, or Firm* — Mendelsohn Dunleavy, P.C.; Yuri Gruzdkov

(57) ABSTRACT

An embodiment of the disclosed MIMO transceiver uses a single master clock to generate (i) the sampling-clock signals for the analog-to-digital and digital-to-analog converters and (ii) the multiple electrical local-oscillator signals that are used in various channels of the transceiver's analog down- and up-converters to translate signals between the corresponding intermediate-frequency and RF bands. The MIMO transceiver may employ a plurality of interconnected frequency dividers configured to variously divide the master-clock frequency to generate the sampling-clock signals and the multiple local-oscillator signals in a manner that causes these signals to have different respective frequencies. In embodiments designed for operating in the mmW band, the MIMO transceiver may also employ a frequency multiplier configured to multiply the master-clock frequency to generate an additional local-oscillator signal for translating signals between the mmW and RF bands.

20 Claims, 14 Drawing Sheets

(51) Int. Cl.
*H04J 1/08* (2006.01)
*H04B 7/06* (2006.01)
*H04W 88/08* (2009.01)
*H04B 7/0452* (2017.01)

(56) References Cited

U.S. PATENT DOCUMENTS

| | | | |
|---|---|---|---|
| 6,097,266 | A | 8/2000 | Nardozza et al. |
| 6,366,622 | B1 | 4/2002 | Brown et al. |
| 7,005,942 | B2 | 2/2006 | Culliton et al. |
| 7,102,470 | B2 | 9/2006 | Chang et al. |
| 7,373,113 | B2 | 5/2008 | Lee et al. |
| 7,376,440 | B2 | 5/2008 | Forrester et al. |
| 7,633,849 | B1 * | 12/2009 | Al-Rawi ............ H04L 25/0228 370/208 |
| 7,680,227 | B2 | 3/2010 | Kavadias et al. |
| 8,005,233 | B2 | 8/2011 | Smith |
| 8,085,893 | B2 | 12/2011 | Werner |
| 8,472,889 | B2 | 6/2013 | Behzad |
| 8,577,305 | B1 | 11/2013 | Rossi et al. |
| 2002/0140518 | A1 | 10/2002 | Verghese |
| 2005/0064892 | A1 | 3/2005 | Cavin |
| 2006/0055485 | A1 | 3/2006 | Lobeek |
| 2006/0066419 | A1 | 3/2006 | Iwaki et al. |
| 2006/0140222 | A1 | 6/2006 | Wolf et al. |
| 2007/0002961 | A1 | 1/2007 | Hoctor et al. |
| 2008/0001657 | A1 | 1/2008 | Zhang |
| 2008/0055016 | A1 | 3/2008 | Morris, III et al. |
| 2008/0068236 | A1 | 3/2008 | Sheba et al. |
| 2009/0174486 | A1 | 7/2009 | Haralabidis et al. |
| 2010/0058568 | A1 | 3/2010 | Nam et al. |
| 2010/0091688 | A1 | 4/2010 | Staszewski et al. |
| 2010/0194492 | A1 | 8/2010 | Rijssemus |
| 2010/0328157 | A1 | 12/2010 | Culkin et al. |
| 2011/0002424 | A1 | 1/2011 | Le Guillou |
| 2011/0022637 | A1 | 1/2011 | Khader et al. |
| 2011/0131439 | A1 | 6/2011 | Renner et al. |
| 2011/0169591 | A1 | 7/2011 | Kim et al. |
| 2011/0227766 | A1 | 9/2011 | McLaughlin et al. |
| 2011/0234439 | A1 | 9/2011 | Nishi |
| 2011/0279296 | A1 | 11/2011 | Henzler et al. |
| 2011/0309962 | A1 | 12/2011 | Hernes et al. |
| 2012/0038400 | A1 | 2/2012 | Talaga, Jr. |
| 2012/0062342 | A1 | 3/2012 | Huang et al. |
| 2012/0133400 | A1 | 5/2012 | Yoshimatsu et al. |
| 2012/0321004 | A1 * | 12/2012 | Soul ......................... H03J 7/04 375/259 |
| 2012/0328058 | A1 | 12/2012 | Etemadi et al. |
| 2013/0229954 | A1 * | 9/2013 | Narathong ............ H04B 1/408 370/280 |
| 2013/0230080 | A1 | 9/2013 | Gudem et al. |
| 2013/0272175 | A1 * | 10/2013 | Zargari ..................... H04L 5/14 370/281 |
| 2013/0272463 | A1 * | 10/2013 | Uyehara ............... H04J 3/0685 375/356 |
| 2013/0336368 | A1 | 12/2013 | Arima et al. |
| 2014/0210536 | A1 | 7/2014 | Kurchuk |
| 2014/0219140 | A1 * | 8/2014 | Uyehara ................ H04B 7/024 370/278 |
| 2014/0235182 | A1 * | 8/2014 | Milenkovic .......... H04B 1/0007 455/76 |
| 2015/0065034 | A1 * | 3/2015 | Lenive ..................... H04B 7/10 455/39 |
| 2015/0180521 | A1 * | 6/2015 | Tripurari ............. H03D 7/1441 375/349 |

OTHER PUBLICATIONS

Redmayne, D., et al., "Understanding the Effect of Clock Jitter on High Speed ADCs", Linear Technology Design Note 1013, Linear Technology Corporation 2006, pp. 1-4.

Kester, W., "Converting Oscillator Phase Noise to Time Jitter", pp. 1-10, MT-008, 2009, Analog Devices, Inc, pp. 1-10.

Buchanan, D., "Performance of an IF sampling ADC in receiver applications", International-IC Conference Proceedings, China, 2001, pp. 63-77.

"Single Ended or Differential Clock and Analog Inputs?", Application Note, e2v semiconductors SAS 2007, pp. 1-11.

Neu, T., "Impact of sampling-clock spurs on ADC performance", TI Analog Applications Journal, Texas Instruments Incorporated, 3Q 2009.

Neu, T., "Clock jitter analyzed in the time domain", Part 1, Analog Applications Journal, 3Q 2010, Texas Instruments Incorporated.

Neu, T., "Clock jitter analyzed in the time domain", Part 2, Analog Applications Journal, 4Q 2010, Texas Instruments Incorporated.

Neu, T., "Clock jitter analyzed in the time domain", Part 3, Analog Applications Journal, 3Q 2011, Texas Instruments Incorporated.

Samori, C., et al., "Experimental verification of the link between timing jitter and phase noise," Electronics Letters, vol. 34, No. 21, pp. 2024,2025, Oct. 15, 1998.

"Introducing LTE-Advanced," www.agilent.com/home, 2011 [retrieved on Mar. 3, 2015] Retrieved from the Internet: <URL: http://cp.literature.agilent.com/litweb/pdf/5990-6706EN.pdf> (36 pages).

Hajimiri, Ali, et al., "Jitter and Phase Noise in Ring Oscillators," IEEE Journal of Solid-State Circuits, vol. 34, No. 6, Jun. 1999, pp. 790-804.

"LO Harmonic Effects on I/Q Balance and Sideband Suppression in Complex I/Q Modulators," www.ti.com, 2010 [retrieved on Mar. 3, 2015] Retrieved from the Internet: <URL: http:/http://www.ti.com/lit/an/slwa059/slwa059.pdf> (16 pages).

Akyildiz, Ian F. et al., "The Evolution to 4G Cellular Systems: LTE-Advanced," Physical Communication 3, 2010, pp. 217-244.

"IMT-Advanced: Requirements and Evaluation Criteria," http://projects.celtic-initiative.org, 2009 [retrieved on Mar. 9, 2015] Retrieved from the Internet: <URL: http://projects.celtic-initiative.org/winner+/WINNER+%20Deliverables/D3.1_v1.0.pdf> (64 pages).

Fan Fei, Louis, "Frequency Divider Design Strategies," Broadband Technology, Mar. 2005, (5 pages).

"Clock Dividers Made Easy," www.mikrocontroller.net, 2002 [retrieved on Mar. 31, 2015] Retrieved from the Internet: <URL: http://www.mikrocontroller.net/attachment/177198/Clock_Dividers_Made_Easy.pdf> (19 pages).

Hwang, Myung-Woon, et al., "Design of high speed CMOS prescaler," Proceedings of the Second IEEE Asia Pacific Conference, 2000, pp. 87-90.

Razavi, B., "RF Microelectronics," Prentice Hall, 1998, pp. 290-297.

Dahlman, Erik, et al., "3G Evolution: HSPA and LTE for Mobile Broadband," Published by Elsevier Ltd., 2007 (485 pages).

Marzetta, Thomas L., "Noncooperative Cellular Wireless with Unlimited Numbers of Base Station Antennas," IEEE Transactions on Wireless Communications, vol. 9, No. 11, Nov. 2010, pp. 3590-3600.

Larsson, Erik G., et al., "Massive MIMO for Next Generation Wireless Systems," IEEE Communications Magazine, 2014, vol. 52, No. 2., pp. 186-195.

Shepard, Clayton et al., "Argos: Practical Many-Antenna Base Stations," Proc. ACM Int. Conf. Mobile Computing and Networking (MobiCom), Istanbul, Turkey, 2012, pp. 53-64.

"MAX2828/MAX2829 Single-/Dual-Band 802.11a/b/g World-Band Transceiver ICs," www.maximintegrated.com, 2004 [retrieved on Apr. 7, 2016] Retrieved from the Internet: <URL: https://www.maximintegrated.com/en/products/comms/wireless-rf/MAX2828.html> (39 pages).

Shepard, Clayton et al., "ArgosV2: A Flexible Many-Antenna Research Platform," Proc. 19th Ann. Int. Conf. Mobile Computing and Networking (MobiCom), 2013, pp. 163-165.

Roy, Sébastien, "Two-Layer Linear Processing for Massive MIMO on the Titan MIMO Platform," Nutaq white paper on MIMO Platform (2015).

"5G Massive MIMO Testbed: From Theory to Reality," www.ni.com, 2004 [retrieved on Apr. 7, 2016] Retrieved from the Internet: <URL: http://www.ni.com/white-paper/52382/en/> (11 pages).

(56) References Cited

OTHER PUBLICATIONS

"Building an Affordable 8×8 MIMO Testbed with NI USRP," www.ni.com, 2014 [retrieved on Apr. 7, 2016] Retrieved from the Internet: <URL: http://www.ni.com/white-paper/14311/en/> (5 pages).
"JESD204B Subclasses (part 1): Intro and Deterministic Latency," www.edn.com, 2014 [retrieved on Apr. 7, 2016] Retrieved from the Internet: <URL: http://www.edn.com/design/analog/4431365/JESD204B-Subclasses-part-1-Intro-and-Deterministic-Latency> (11 pages).
"JESD204B Subclasses (Part 2): Subclass 1 vs. Subclass 2 System Considerations," www.analog.com, 2014 [retrieved on Apr. 7, 2016] Retrieved from the Internet: <URL: http://www.analog.com/media/en/technical-documentation/technical-articles/JESD204B-Subclasses-Part-2-Subclass-1-vs-Subclass-2-System-Considerations-MS-2677.pdf> (6 pages).
Kurchuk, Boris A., et al., "Multichannel Receiver," U.S. Appl. No. 14/675,100, filed Mar. 31, 2015 (26 pages).
Hasan, S.M. Shajedul, et al., "Integration of Simple Antennas to Multiband Receivers using a Novel Multiplexer Design Methodology," IEEE Trans. Ant. & Prop., vol. 60, No. 3, 2012, pp. 1550-1556.
Doan, Chinh H., et al., "Design Considerations for 60 GHz CMOS Radios," IEEE Communications Magazine, 2004, vol. 42, No. 12, pp. 132-140.
Zhou, Shengli et al., "Optimal Transmitter Eigen-Beamforming and Space-Time Block Coding Based on Channel Mean Feedback," IEEE Transactions on Signal Processing, vol. 50, No. 10, 2002, pp. 2599-2613.
Madhow, U., et al., "Distributed massive MIMO: algorithms, architectures and concept systems," Information Theory and Applications Workshop (ITA), 2014 (7 pages).
Rogalin, R., et al., "Scalable Synchronization and Reciprocity Calibration for Distributed Multiuser MIMO IEEE," Transactions on Wireless Communications, vol. 13, No. 4, 2014, pp. 1815-1816.
Ayach, Omar El, et al., "Spatially Sparse Precoding in Millimeter Wave MIMO Systems," IEEE Transactions on Wireless Communications, vol. 13, No. 3, 2014, pp. 1499-1513.
Obara, Tatsunori et al., "Joint Fixed Beamforming and Eigenmode Precoding for Super High Bit Rate Massive MIMO Systems Using Higher Frequency Bands," IEEE 25th Annual International Symposium on Personal, Indoor, and Mobile Radio Communication (PIMRC) 2014, pp. 607-611.
Hong, M., et al., "Joint Base Station Clustering and Beamformer Design for Partial Coordinated Transmission in Heterogeneous Networks," IEEE Journal on Selected Areas in Communications, vol. 31, No. 2, Feb. 2013.
Adhikary, A., et al., "Joint Spatial Division and Multiplexing—The Large Scale Array Regime," IEEE Transactions on Information Theory, vol. 59, No. 10, Oct. 2013.
Nam, J., et al., "Joint Spatial Division and Multiplexing: Opportunistic Beamforming, User Grouping and Simplified Downlink Scheduling," IEEE Journal of Selected Topics in Signal Processing, vol. 8, No. 5, Oct. 2014.
International Search Report and Written Opinion; dated Jul. 12, 2017 for PCT Application No. PCT/US2017/025670.

\* cited by examiner

100

500

600

212₁

212₂

212₃

212₄

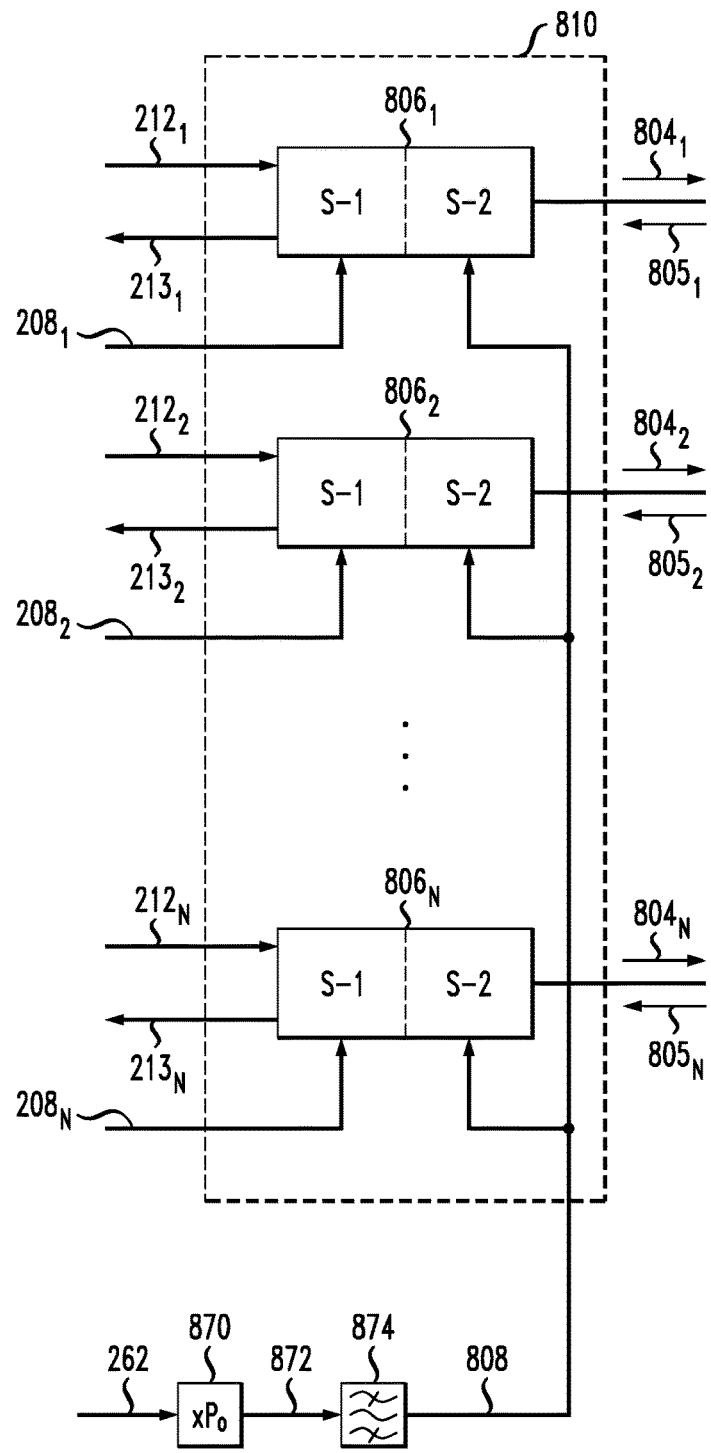

262

872

808

1100

1300

US 10,033,443 B2

MIMO TRANSCEIVER SUITABLE FOR A MASSIVE-MIMO SYSTEM

FIELD

The present disclosure relates to communication equipment and, more specifically but not exclusively, to multiple-input/multiple-output (MIMO) wireless transceivers.

DESCRIPTION OF THE RELATED ART

This section introduces aspects that may help facilitate a better understanding of the disclosure. Accordingly, the statements of this section are to be read in this light and are not to be understood as admissions about what is in the prior art or what is not in the prior art.

A major obstacle to the commercial deployment of massive-MIMO (M-MIMO) systems is the complexity and relatively high cost of the hardware in the radio-frequency (RF) section, which dramatically rise with an increase in the number of antennas. Since an M-MIMO transceiver can utilize hundreds of antennas, the cost of conventional RF equipment used therein can be prohibitive for commercial applications. As a result, practical solutions directed at reducing the complexity and cost of the M-MIMO equipment are being actively developed by the telecom industry.

SUMMARY OF SOME SPECIFIC EMBODIMENTS

An embodiment of the disclosed MIMO transceiver uses a single master clock to generate (i) the sampling-clock signal that clocks the analog-to-digital converter in the receiver branch of the transceiver, (ii) the sampling-clock signal that clocks the digital-to-analog converter in the transmitter branch of the transceiver, and (iii) multiple electrical local-oscillator signals that are used in various channels of the transceiver's analog down- and up-converters to translate signals between the corresponding intermediate-frequency and RF bands. The MIMO transceiver may employ a plurality of interconnected frequency dividers configured to variously divide the master-clock frequency to generate the two sampling-clock signals and the multiple local-oscillator signals in a manner that causes these signals to have different respective frequencies. In embodiments designed for operating in the millimeter-wave (or centimeter-wave) band, the MIMO transceiver may also employ a frequency multiplier configured to multiply the master-clock frequency to generate an additional local-oscillator signal for translating signals between the millimeter-wave (or centimeter-wave) and RF bands.

The disclosed transceiver architecture can advantageously provide a reduction of the transceiver size and/or cost and a performance improvement with respect to conventional transceiver architectures on a scale that makes the disclosed transceiver architecture suitable for use in a wide range of emerging wireless devices and systems, such as nodes for the Internet of Things, 5G user equipment, M-MIMO base stations, etc.

According to one embodiment, provided is an apparatus comprising: a plurality of first mixers, each one of the plurality of first mixers being configured to mix a respective one of a plurality of first analog intermediate-frequency (IF) signals and a respective one of a plurality of electrical local-oscillator (LO) signals to generate a respective one of a plurality of first electrical RF signals, each electrical LO signal of the plurality of LO signals having a different respective frequency; a plurality of second mixers, each one of the plurality of second mixers being configured to mix a respective one of a plurality of second electrical RF signals and a respective one of the plurality of electrical LO signals to generate a respective one of a plurality of second analog IF signals; and a plurality of frequency dividers configured to frequency divide a master-clock signal to generate the plurality of electrical LO signals of different frequencies.

BRIEF DESCRIPTION OF THE DRAWINGS

Other aspects, features, and benefits of various disclosed embodiments will become more fully apparent, by way of example, from the following detailed description and the accompanying drawings, in which:

FIG. 8 shows a block diagram of an analog electrical circuit that can be used in the wireless transceiver of FIG. 2 according to an alternative embodiment;

DETAILED DESCRIPTION

Some embodiments disclosed herein may benefit from the subject matter disclosed in commonly owned U.S. patent application Ser. No. 14/675,100, which is incorporated herein by reference in its entirety.

Figure 1:
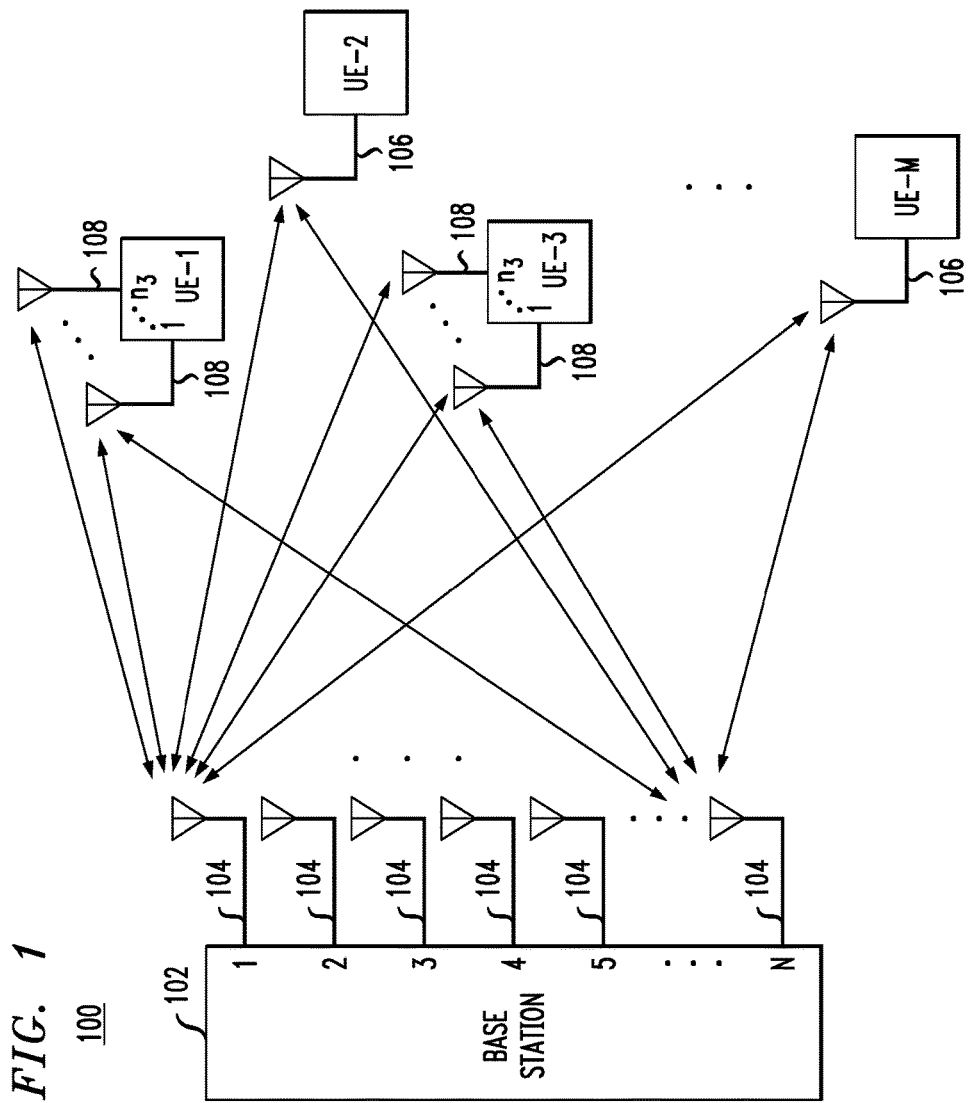
FIG. 1 shows a block diagram of a wireless communication system in which various embodiments disclosed herein can be used.

FIG. 1 shows a block diagram of a wireless communication system 100 in which various embodiments disclosed herein can be used. System 100 comprises a base station 102 and M user-equipment units UE-i, where i=1, 2, . . . , M. Base station 102 has N antennas. Some of the user-equipment units, such as UE-2 and UE-M, may have a respective single antenna 106. Some other user-equipment units, such as UE-1 and UE-3, may have multiple antennas 108. For example, user-equipment unit UE-1 is shown in FIG. 1 as having $n_1$ antennas. User-equipment unit UE-3 is shown as having $n_3$ antennas.

In an example embodiment, the number N can be on the order of one hundred or even more. In general, the number N can be selected such that it is significantly larger (e.g., by a factor of ten or more) than the projected number M of user-equipment units UE-i that can be, at the same time, in the wireless cell corresponding to base station 102. The numbers $n_1$ and $n_3$ can be in the range between two and twenty. A person of ordinary skill in the art will understand that other combinations of the numbers N, M, and $n_j$ are also possible.

Possible applications of system 100 can be in the areas of multi-beam satellite, cellular, and local area networks. Depending on the type of application, user-equipment units UE-i can be satellite-compatible phones, smart phones, tablets, laptops, etc. The equipment used in base station 102 is also selected accordingly. Some embodiments of the wireless transceivers described below in reference to FIGS. 2-13 can be used to implement base station 102. Some other embodiments of the wireless transceivers described below in reference to FIGS. 2-13 can be used to implement the multi-antenna user-equipment units UE-i. A subset of the embodiments of the wireless transceivers described below in reference to FIGS. 2-13 can be used to implement multi-antenna relay-station units, e.g., configured to perform multi-channel and/or multi-user relay functions. A person of ordinary skill in the art will understand that applications of the inventive concepts disclosed herein are not necessarily limited to M-MIMO systems, but can also be used in other (such as legacy) MIMO systems.

Figure 2:
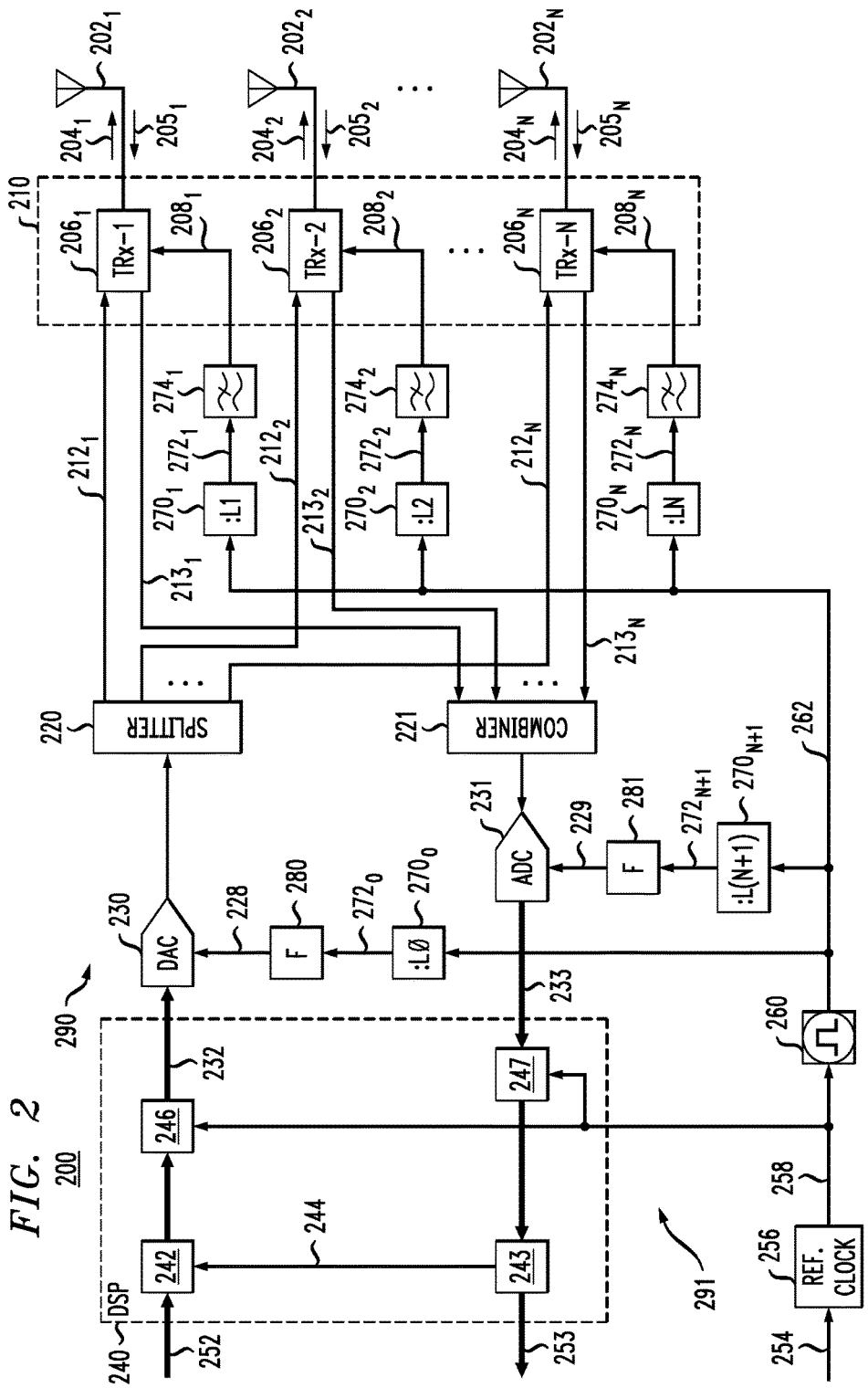
FIG. 2 shows a block diagram of a wireless transceiver that can be used in the wireless communication system of FIG. 1 according to an embodiment.

FIG. 2 shows a block diagram of a wireless transceiver 200 that can be used in wireless communication system 100 (FIG. 1) according to an embodiment. Transceiver 200 comprises an array of antennas $202_1$-$202_N$, each coupled to a respective one of channel modules $206_1$-$206_N$ of an RF front end 210. Each of the channel modules $206_1$-$206_N$ receives a respective one of intermediate-frequency (IF) signals $212_1$-$212_N$ from a transmitter branch 290 during a transmit operation, and applies a respective one of IF signals $213_1$-$213_N$ to a receiver branch 291 during a receive operation. In an example embodiment, transmitter branch 290 comprises a signal splitter (e.g., frequency de-multiplexer) 220, a single digital-to-analog converter (DAC) 230, and digital circuits 242 and 246. Receiver branch 291 comprises a signal combiner (e.g., frequency multiplexer) 221, a single analog-to-digital converter (ADC) 231, and digital circuits 243 and 247. Digital circuits 242, 243, 246, and 247 are parts of a digital signal processor 240, and their operation is described in more detail below in reference to FIGS. 5-7.

During a receive operation, each antenna $202_i$ converts a received electromagnetic wave into a corresponding electrical RF signal $205_i$, where i=1, 2, . . . , N. Each channel module $206_i$ then (i) converts electrical RF signal $205_i$ generated by antenna $202_i$ into the corresponding electrical IF signal $213_i$ using a respective electrical local-oscillator (LO) signal $208_i$ and (ii) applies electrical IF signal $213_i$ to signal combiner 221. During a transmit operation, each channel module $206_i$ converts the respective electrical IF signal $212_i$ received from signal splitter 220 into a corresponding electrical RF signal $204_i$, with the conversion being performed using the respective electrical LO signal $208_i$. The corresponding antenna $202_i$ then converts the electrical RF signal $204_i$ into a corresponding outgoing electromagnetic wave. Example embodiments of channel module 206 are described in more detail below in reference to FIGS. 3-4.

LO signals $208_1$-$208_N$, a sampling-clock signal 228 that clocks DAC 230, and a sampling-clock signal 229 that clocks ADC 231 are generated using a master-clock generator 260. More specifically, master-clock generator 260 is configured to generate a master-clock signal 262 based on a digital-reference-clock signal 258 in a manner that causes the master-clock signal to have a relatively high frequency, sufficiently low jitter, and sufficiently fast slew rate. In an example embodiment, master-clock generator 260 can be implemented using a PLL, with digital-reference-clock signal 258 being applied to the PLL as a reference input signal. The output of the voltage-controlled oscillator (VCO) in the PLL can be buffered, e.g., as known in the art, to cause master-clock signal 262 to have the aforementioned desired characteristics.

In an example embodiment, digital-reference-clock signal 258 is generated using a digital clock generator 256. In some embodiments, digital clock generator 256 can be configured to generate digital-reference-clock signal 258 based on an external clock reference signal 254.

A plurality of frequency dividers $270_0$-$270_{N+1}$ are configured to variously divide the frequency of master-clock signal 262 to generate divided-frequency signals $272_0$-$272_{N+1}$, respectively. Each of divided-frequency signals $272_0$-$272_{N+1}$ typically has multiple frequency components that include a respective main divided frequency and also higher harmonics and/or sub-harmonics of the main divided frequency. The main divided frequency in a divided-frequency signal $272_k$ generated by frequency divider $270_k$ is lower than the frequency of master-clock signal 262 by a fixed division factor $L_k$, where k=0, 1, 2, . . . , N+1. In various embodiments, the set of division factors $L_k$ may include integer values or mixed fractional values, or some combination of both. In some embodiments, the set of division factors $L_k$ may have N+2 different values.

A filter $274_i$ located between frequency divider $270_i$ and channel module $206_i$ is configured to generate LO signal $208_i$ by passing through the main divided frequency of signal $272_i$, while stopping, attenuating, and/or rejecting the higher-order harmonics and, in some embodiments, also the sub-harmonics thereof. In an example embodiment, filters $274_1$-$274_N$ can be implemented as low-pass filters. In an alternative embodiment, filters $274_1$-$274_N$ can be implemented as band-pass filters.

A filter 281 located between frequency divider $270_{N+1}$ and ADC 231 generates sampling-clock signal 229 by passing through the main divided frequency of signal $272_{N+1}$ and a predetermined number of the odd higher harmonics thereof, while stopping or rejecting the other harmonics and sub-harmonics of the main divided frequency, and possibly some noise that might be coupled to the sampling-clock channel due to EMI, the presence of power-supply noise, and/or via any other parasitic coupling mechanism. A representative filter that can be used as filter 281, as well as representative benefits of its use in generating the sampling-clock signal of an ADC, such as ADC 231, are described in commonly owned U.S. Patent Application Publication No. 2014/0210536, which is incorporated herein by reference in its entirety.

A filter 280 located between frequency divider $270_0$ and DAC 230 generates sampling-clock signal 228 by filtering divided-frequency signal $272_0$. In an example embodiment, filter 280 can be similar to filter 281.

Figure 3:
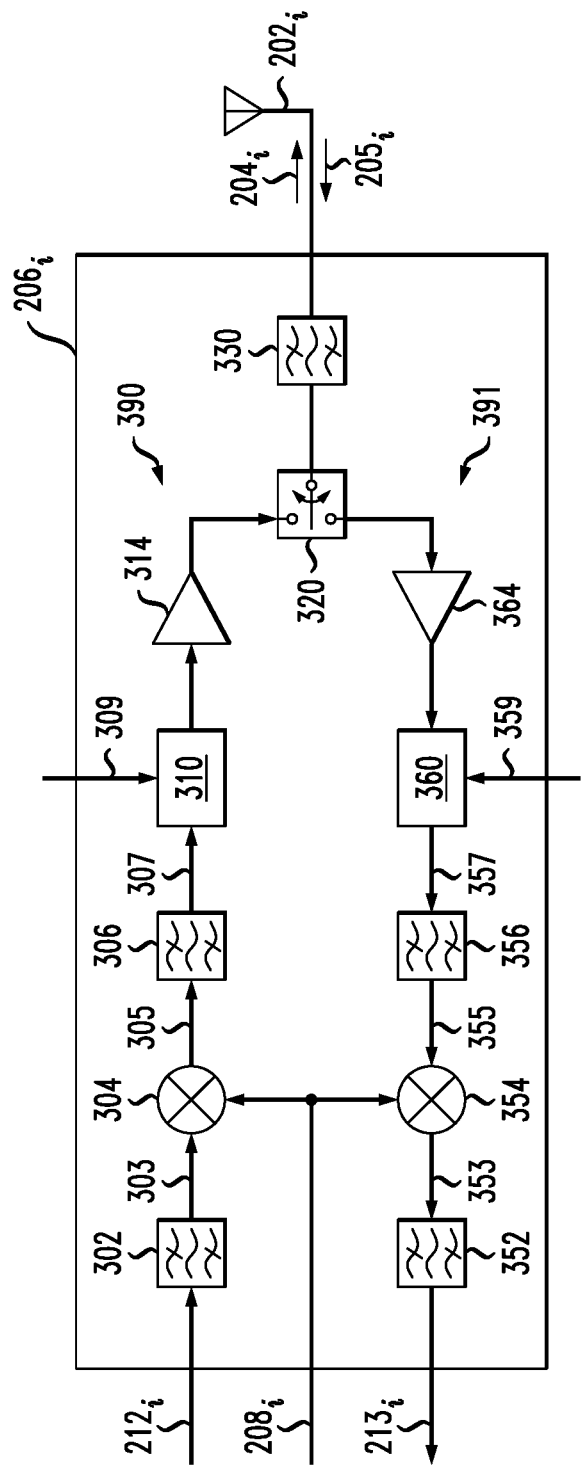
FIG. 3 shows a block diagram of a channel module that can be used in the wireless transceiver of FIG. 2 according to an embodiment.

FIG. 3 shows a block diagram of a channel module $206_i$ (FIG. 2) according to an embodiment. More specifically, channel module $206_i$ of FIG. 3 is designed for a time-division-duplex (TDD) scheme. As known in the pertinent art, a TDD scheme can be implemented using a communication link in which uplink and downlink transmissions are separated from one another by the allocation of different respective (e.g., alternating) time slots in the same frequency band.

Channel module $206_i$ has a switch 320 that connects antenna $202_i$, by way of a band-pass filter 330, to either a transmit branch 390 or a receive branch 391 of that channel module. In alternative embodiments, any suitable three-port device can be used instead of switch 320. For example, in some embodiments a conventional circulator that rotates the power between its ports can be used instead of switch 320.

Transmit branch 390 is configured to receive IF signal $212_i$ and includes band-pass filters 302 and 306, a mixer 304, an optional analog weighting block 310, and an amplifier 314. Receive branch 391 is configured to output IF signal $213_i$ and includes band-pass filters 352 and 356, a mixer 354, an optional analog weighting block 360, and an amplifier 364. The control signals that control the configurations of weighting blocks 310 and 360 are labeled in FIG. 3 as 309 and 359, respectively.

Analog weighting blocks 310 and 360 are optional because these weighting blocks may not be needed, for example, in embodiments in which "digital" MIMO beamforming algorithms are used. Control signals 309 and 359 can be generated based on the corresponding pre-selected beamforming algorithm. For example, for a pre-selected analog beamforming algorithm, weighting blocks 310 and 360 may include respective pluralities of cascaded variable-gain amplifiers/attenuators and (phase shifters)/(phase switches)/(delay lines) (not explicitly shown in FIG. 3). DSP 240 may then be configured to run the pre-selected beamforming algorithm to cause control signals 309 and 359 to set both the amplitude and the phase of the transmitter and receiver signal vectors. As another example, for a pre-selected hybrid beamforming algorithm, weighting blocks 310 and 360 may include respective pluralities of phase shifters/delay lines (not explicitly shown in FIG. 3). DSP 240 may then be configured to run the pre-selected hybrid beamforming algorithm to cause control signals 309 and 359 to set the phase of the transmitter and receiver signal vectors.

During a transmit phase of the TDD scheme, band-pass filter 302 operates to select a designated sub-band 303 of IF signal $212_i$ while rejecting other sub-bands thereof. Mixer 304 mixes sub-band 303 with LO signal $208_i$ to generate a mixed signal 305. Band-pass filter 306 then selects an RF sub-band 307 of mixed signal 305 corresponding to the sum frequency of sub-band 303 and LO signal $208_i$, thereby completing the up-conversion process from IF to RF. Weighting block 310, amplifier 314, and band-pass filter 330 then appropriately condition RF signal 307 to generate RF signal $204_i$ applied to antenna $202_i$.

During a receive phase of the TDD scheme, band-pass filter 330, amplifier 364, and weighting block 360 appropriately condition RF signal $205_i$ generated by antenna $202_i$ to generate an RF signal 357 that is better suitable for processing in the downstream circuits of receiver branch 391. Band-pass filter 356 then selects a sub-band 355 of RF signal 357 for down-conversion. Mixer 354 mixes sub-band 355 with LO signal $208_i$ to generate a mixed signal 353. Band-pass filter 352 then selects an IF sub-band of mixed signal 353 corresponding to the difference frequency of sub-band 355 and LO signal $208_i$, thereby generating IF signal $213_i$.

Figure 4:
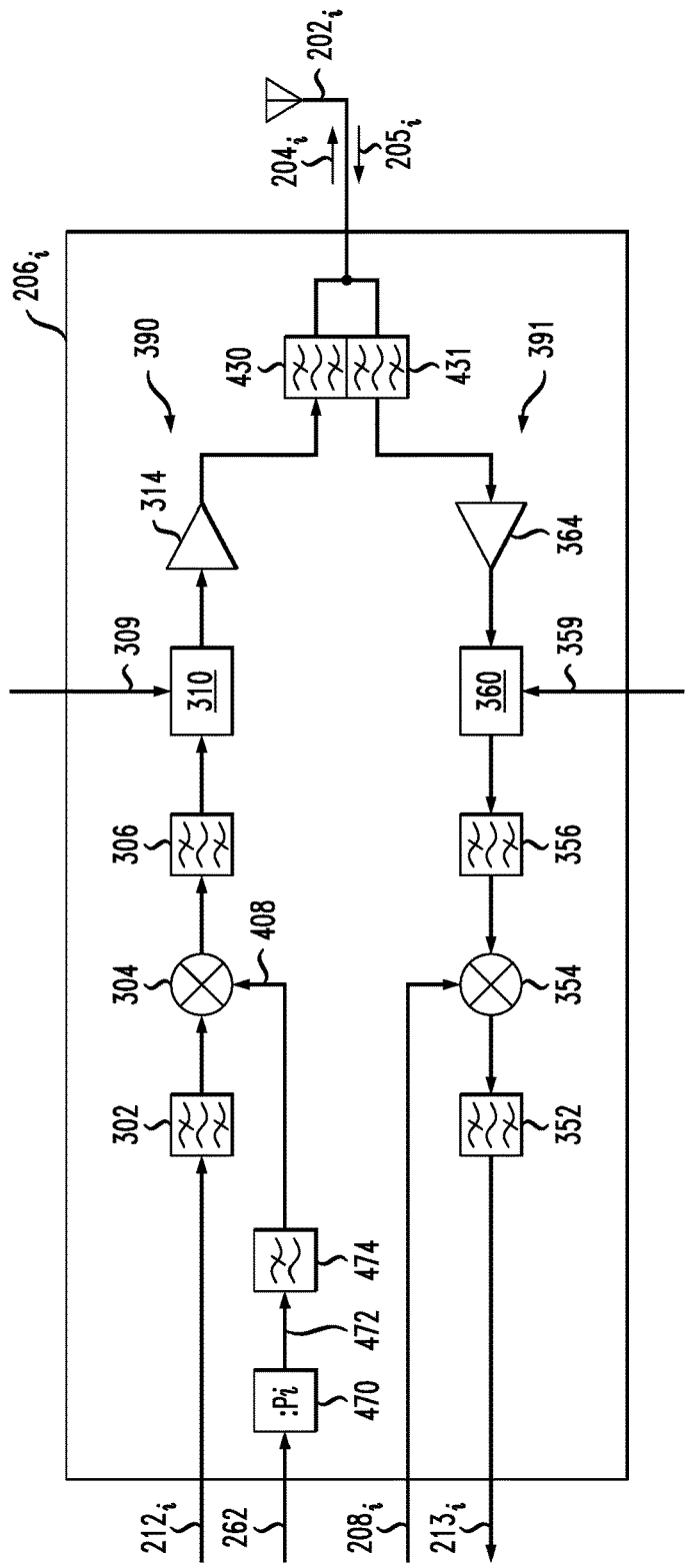
FIG. 4 shows a block diagram of a channel module that can be used in the wireless transceiver of FIG. 2 according to an alternative embodiment.

FIG. 4 shows a block diagram of a channel module $206_i$ (FIG. 2) according to an alternative embodiment. More specifically, channel module $206_i$ of FIG. 4 is designed for a frequency-division-duplex (FDD) scheme. As known in the pertinent art, an FDD scheme implements a technique in which separate frequency bands are used for uplink and downlink transmissions.

Similar to channel module $206_i$ of FIG. 3, channel module $206_i$ of FIG. 4 has a transmit branch 390 and a receive branch 391. However, these branches are now configured to receive different LO signals. More specifically, transmit branch 390 receives a LO signal 408, whereas receive branch 391 receives LO signal $208_i$. LO signal 408 is generated using a frequency divider 470 and a filter 274. Frequency divider 470 is configured to divide the frequency of master-clock signal 262 by a respective division factor $P_i$ ($\neq L_i$) to generate a divided-frequency signal 472. Filter 474 then operates to generate LO signal 408 by passing through the main divided frequency of signal 472. In an example embodiment, filter 474 can be implemented as a low-pass filter.

Another difference between the embodiments of channel module $206_i$ shown in FIGS. 3 and 4 is that, in the latter embodiment, transmit branch 390 and receive branch 391 are connected to antenna $202_i$ typically by way of two different band-pass filters, which are labeled in FIG. 4 as 430 and 431, respectively. A person of ordinary skill in the art will understand that filters 430 and 431 have different band-pass characteristics due to the use of separate frequency bands for uplink and downlink transmissions in the corresponding FDD scheme. In some embodiments, one of the RF filters in the duplexer, for example, a receive-path RF filter can be omitted, and the attenuation of the transmit signal coupled to the receive path can be performed in the digital domain, e.g., as known in the art, as a cancellation of the transmit signal.

Figure 5:
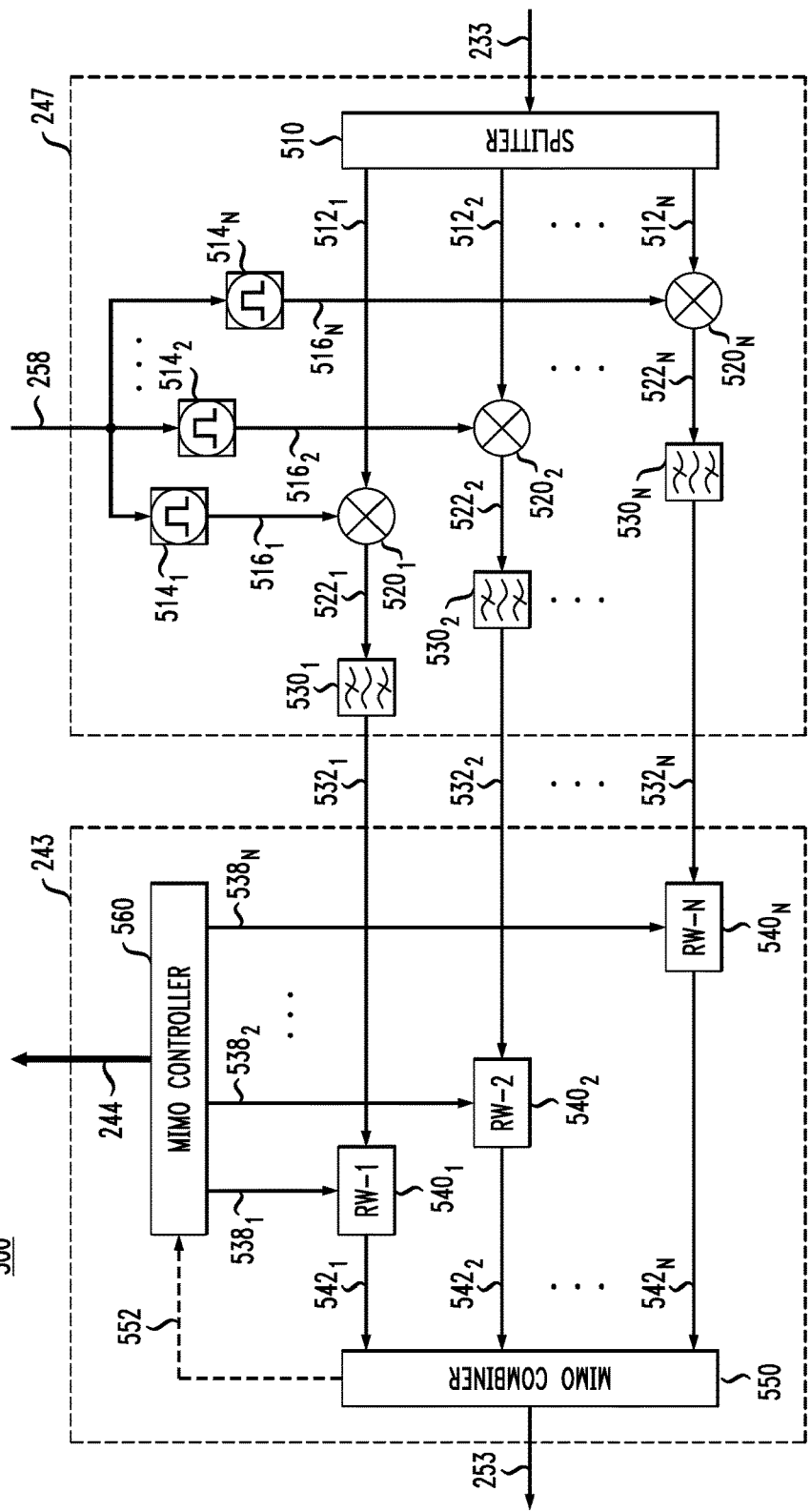
FIG. 5 shows a block diagram of a digital receive circuit that can be used in the wireless transceiver of FIG. 2 according to an embodiment.

FIG. 5 shows a block diagram of a digital circuit 500 that can be used in DSP 240 (FIG. 2) according to an embodiment. As indicated in FIG. 5, digital circuit 500 comprises digital circuits 243 and 247 (also see FIG. 2).

Digital circuit 247 is configured to translate a digital electrical signal 233 received from ADC 231 (also see FIG. 2) to one or more baseband channels for further processing in downstream digital circuits of DSP 240. Frequency translation is achieved by digitally mixing, in digital mixers $520_1$-$520_N$, (i) a plurality of portions $512_1$-$512_N$ of digital electrical signal 233 generated by a digital signal splitter 510 and (ii) a plurality of digital LO signals $516_1$-$516_N$ generated by numerically controlled oscillators (NCOs) $514_1$-$514_N$, respectively, as indicated in FIG. 5. Each of the resulting mixed digital signals $522_1$-$522_N$ is filtered in a respective one of digital filters $530_1$-$530_N$ to generate a respective one of digital baseband signals $532_1$-$532_N$. Digital filters $530_1$-$530_N$ typically operate to provide decimation and baseband-channel selectivity. More specifically, the frequencies of digital LO signals $516_1$-$516_N$ and the band-pass characteristics of digital filters $530_1$-$530_N$ are selected, e.g., according to a predefined frequency plan. In addition, NCOs $514_1$-$514_N$ are configured to generate digital LO signals $516_1$-$516_N$ using the common digital-reference-clock signal 258 (also see FIG. 2).

Digital circuit 243 operates to generate a composite output signal 253 (also see FIG. 2) based on weighted copies of digital baseband signals $532_1$-$532_N$. More specifically, digital circuit 243 has a plurality of receiver-branch weighting (RW-i) circuits $540_1$-$540_N$, each configured to apply a respective weighting coefficient $538_i$ to a respective one of digital baseband signals $532_1$-$532_N$. A MIMO combiner 550 then applies an appropriate MIMO algorithm to combine the resulting weighted signals $542_1$-$542_N$, thereby generating the corresponding composite output signal 253. MIMO combiner 550 may also operate to provide an estimated channel-state information (CSI) 552 to a MIMO controller 560 for being used, e.g., as known in the art, to set the values of the weighting coefficients $538_1$-$538_N$ and also to generate a calibration signal 244 for digital circuit 242 (also see FIGS. 2 and 6). In various embodiments, the MIMO algorithms suitable for use in digital circuit 243 include, but are not limited to Maximal-Ratio-Combining (MRC) algorithms, Zero-Forcing (ZF) algorithms, Regularized Zero-Forcing (RZF) algorithms, etc.

Figure 6:
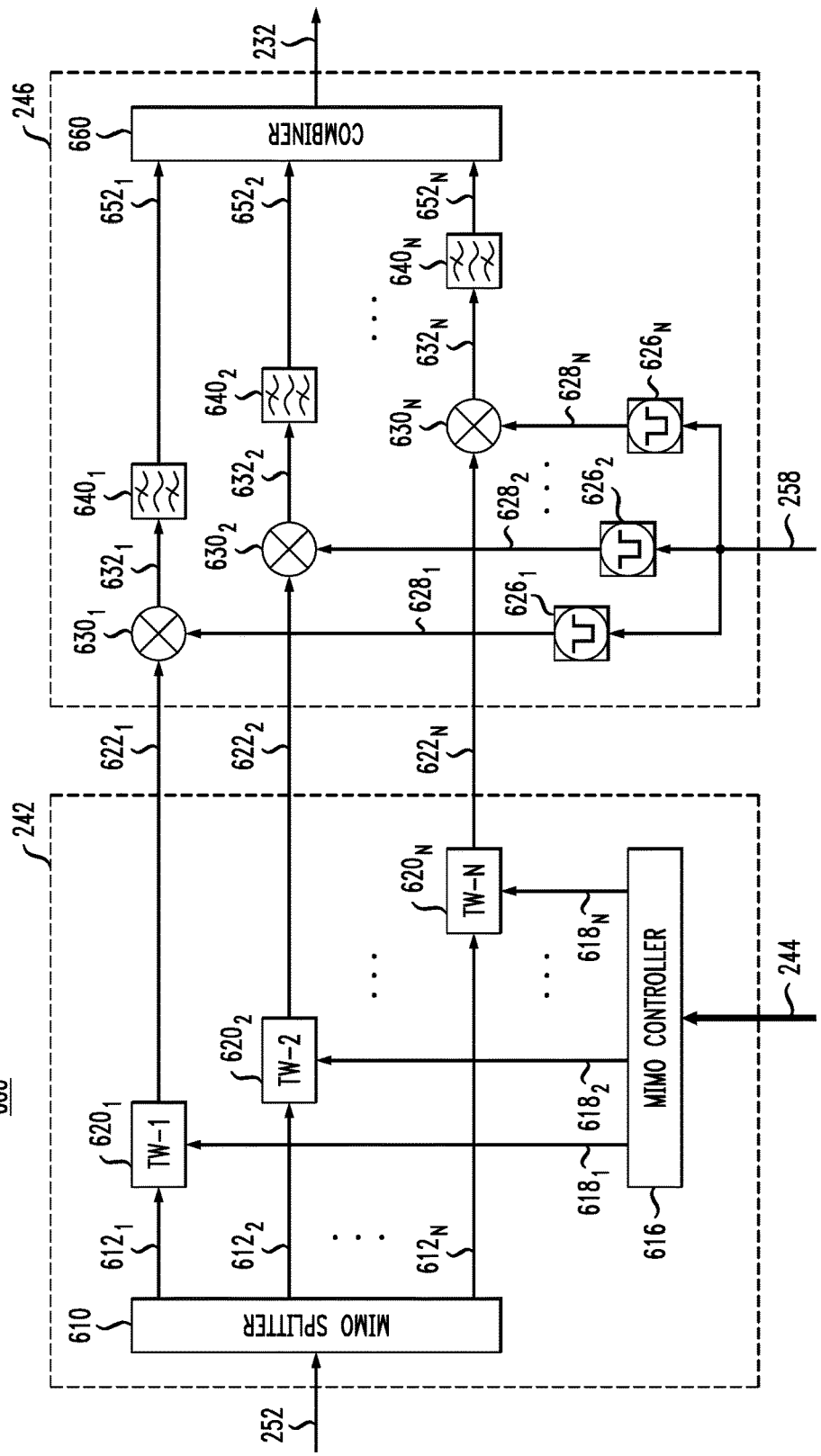
FIG. 6 shows a block diagram of a digital transmit circuit that can be used in the wireless transceiver of FIG. 2 according to an embodiment.

FIG. 6 shows a block diagram of a digital circuit 600 that can be used in DSP 240 (FIG. 2) according to an embodiment. As indicated in FIG. 6, digital circuit 600 comprises digital circuits 242 and 246 (also see FIG. 2).

Digital circuit 242 operates to apply MIMO pre-processing to a digital input signal 252 (also see FIG. 2). More specifically, a MIMO splitter 610 splits digital input signal 252 into a plurality of portions $612_1$-$612_N$. Transmitter-branch weighting (TW-i) circuits $620_1$-$620_N$ then generate weighted signals $622_1$-$622_N$ by applying weighting coefficients $618_1$-$618_N$ to portions $612_1$-$612_N$, respectively. A MIMO controller 616 operates to set the weighting coefficients $618_1$-$618_N$ based on calibration signal 244 received from digital circuit 243 (also see FIGS. 2 and 5). Digital circuit 246 then generates a digital output signal 232 by further processing, as described below, the weighted signals $622_1$-$622_N$ received from digital circuit 242 and applies that digital output signal to DAC 230 (see FIG. 2).

Digital circuit 246 is configured to up-convert each of weighted signals $622_1$-$622_N$ from baseband to a respective one of IF bands $652_1$-$652_N$. This up-conversion is performed by first digitally mixing weighted signals $622_1$-$622_N$ and digital LO signals $628_1$-$628_N$ in digital mixers $630_1$-$630_N$, respectively. Each of the resulting mixed digital signals $632_1$-$632_N$ is filtered in a respective one of digital filters $640_1$-$640_N$ to generate a respective one of digital IF signals $652_1$-$652_N$, as indicated in FIG. 6. A digital-signal combiner 660 then combines digital IF signals $652_1$-$652_N$ to generate digital output signal 232.

Digital LO signals $628_1$-$628_N$ are generated by NCOs $626_1$-$626_N$, respectively, using the common digital-reference-clock signal 258 (also see FIG. 2). The frequencies of digital LO signals $628_1$-$628_N$ and the band-pass characteristics of digital filters $640_1$-$640_N$ are selected in accordance with a predefined frequency plan, e.g., the same frequency plan that is used in digital circuit 247 (see FIG. 5).

Figure 7A:
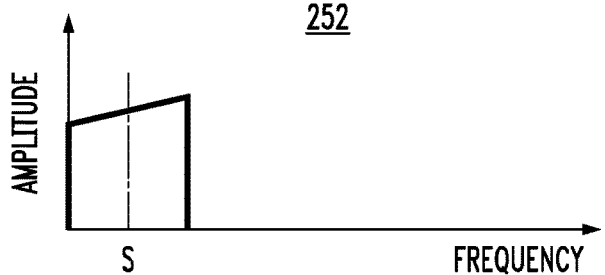
FIGS. 7A-7I graphically illustrate an example transmit operation of the wireless transceiver of FIG. 2 according to an embodiment.
Figure 7B:
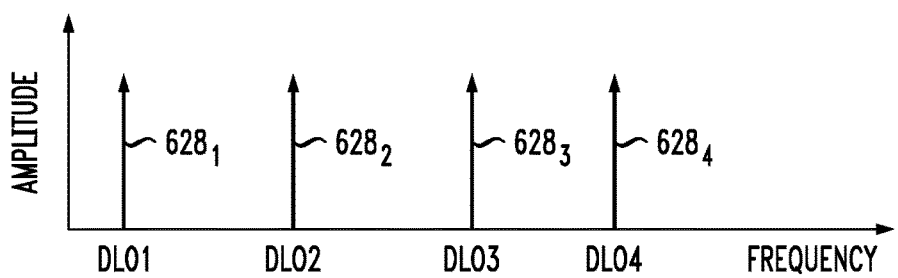
Figure 7C:
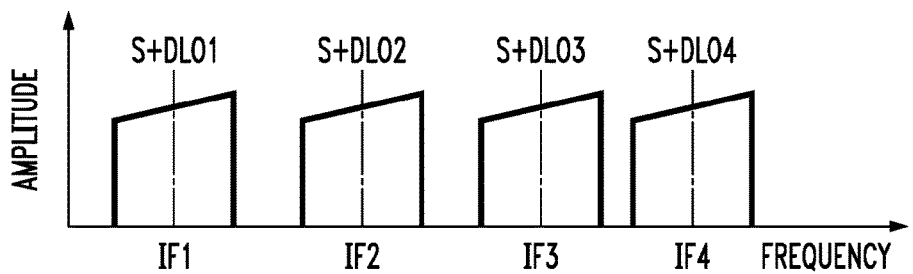
Figure 7D:
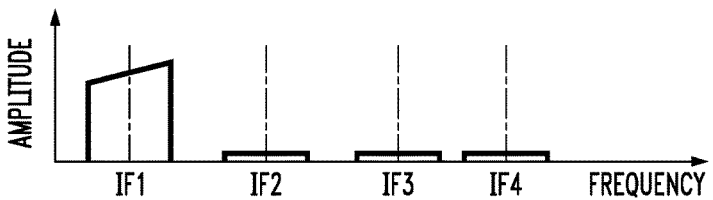
Figure 7E:
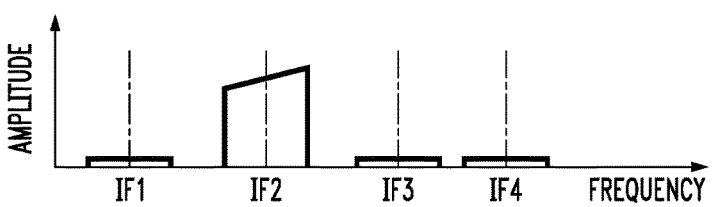
Figure 7F:
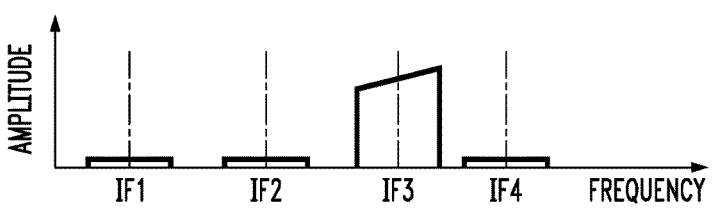
Figure 7G:
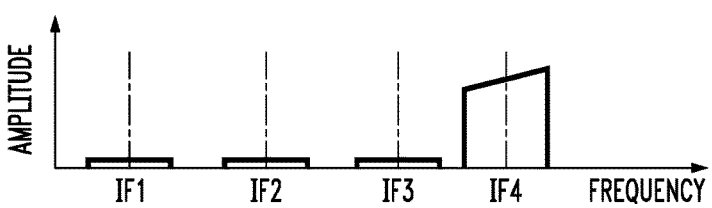
Figure 7H:
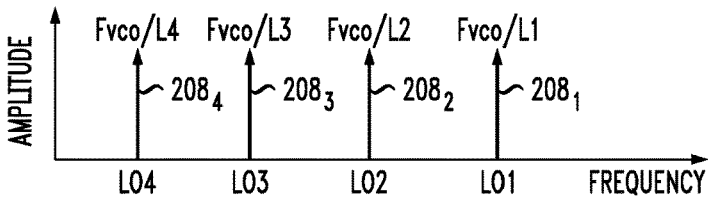
Figure 7I:
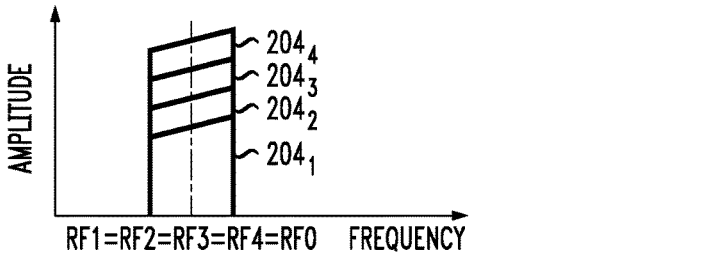

FIGS. 7A-7I graphically illustrate an example transmit operation of wireless transceiver 200 (FIG. 2) according to an embodiment. More specifically, the graphs shown in FIGS. 7A-7I represent an illustrative embodiment of wireless transceiver 200 having four channels (i.e., N=4). FIG. 7A graphically shows the spectrum of digital baseband signal 252 (FIGS. 2, 6). FIG. 7B graphically shows the spectra of digital LO (DLO) signals $628_1$-$628_4$ (FIG. 6). FIG. 7C graphically shows the spectrum of digital IF signal 232 (FIGS. 2, 6). FIGS. 7D-7G graphically show the spectra of analog IF signals $212_1$-$212_4$ (FIG. 2), respectively. FIG. 7H graphically shows the spectra of LO signals $208_1$-$208_4$ (FIG. 2). FIG. 7I graphically shows the spectra of electrical RF signals $204_1$-$204_4$ (FIG. 2). Also note that the abscissas in the graphs shown in FIGS. 7A-7I have different scales, and the graph origins are not necessarily located at the zero (dc) frequency.

Referring to FIG. 7A, the center frequency of digital baseband signal 252 is labeled as S.

Referring to FIG. 7B, DLO signals $628_1$-$628_4$ have frequencies DLO1-DLO4, respectively.

Referring to FIG. 7C, digital IF signal 232 has four IF bands centered on frequencies IF1-IF4, respectively. The relationship between S, IF1-IF4, and DLO1-DLO4 is indicated in FIG. 7C.

Referring to FIGS. 7D-7G, splitter 220 operates similar to a frequency de-multiplexer in which different components of the analog form of the digital IF signal 232 are separated from one another based on their frequencies. More specifically, the first output of splitter 220, which corresponds to IF signal $212_1$, receives the IF band that is centered at frequency IF1 while substantially not receiving any other IF bands, as indicated in FIG. 7D. The second output of splitter 220, which corresponds to IF signal $212_2$, receives the IF band that is centered at frequency IF2 while substantially not receiving any other IF bands, as indicated in FIG. 7E. The third output of splitter 220, which corresponds to IF signal $212_3$, receives the IF band that is centered at frequency IF3 while substantially not receiving any other IF bands, as indicated in FIG. 7F. The fourth output of splitter 220, which corresponds to IF signal $212_4$, receives the IF band that is centered at frequency IF4 while substantially not receiving any other IF bands, as indicated in FIG. 7G.

Referring to FIG. 7H, LO signals $208_1$-$208_4$ have frequencies LO1-LO4, respectively. Each of frequencies LO1-LO4 is generated by dividing the output frequency of the VCO (Fvco) located in the PLL of master-clock generator 260 by a respective one of division factors $L_1$-$L_4$.

Referring to FIG. 7I, the spectral bands representing electrical RF signals $204_1$-$204_4$ may have different amplitudes and phases according to the operating beamforming algorithm but are all centered on the same carrier frequency $RF_0$. This frequency overlap occurs because the LO frequencies LO1-LO4 monotonously decrease from LO1 to LO4 as indicated in FIG. 7H, whereas the IF frequencies IF1-IF4 monotonously increase from IF1 to IF4 by the same amounts, e.g., as indicated in FIG. 7C.

Various signals generated in wireless transceiver 200 during an example receive operation can be analogous to those described in the above-cited U.S. patent application Ser. No. 14/675,100 in reference to FIGS. 3A-3E thereof.

FIG. 8 shows a block diagram of an analog electrical circuit 800 that can be used in wireless transceiver 200 (FIG. 2) according to an alternative embodiment. Circuit 800 can be used to replace RF front end 210, thereby changing the frequency range in which wireless transceiver 200 transmits and receives electromagnetic waves to a higher frequency band, for example, to the upper part of a centimeter-wave (cm-W) band and/or to a millimeter-wave (mmW) band. As used herein, the term "millimeter wave" refers to the electromagnetic radiation with carrier frequencies between about 10 GHz and about 300 GHz, or carrier wavelengths between about 3 cm and about 1 mm. For comparison, an embodiment of wireless transceiver 200 described above in reference to FIGS. 2-7 typically operates in the carrier-frequency range between about 100 MHz and about 10 GHz.

In an example embodiment, circuit 800 comprises a mmW front end 810 designed to be connected to antennas $202_1$-$202_N$ (see FIG. 2). Front end 810 comprises channel modules $806_1$-$806_N$, each having a respective first frequency-conversion stage S-1 and a respective second frequency-conversion stage S-2. In operation, stage S-1 performs up- and down conversion of electrical signals between intermediate frequencies and radio frequencies using LO signal $208_i$ (see FIG. 2). As such, stage S-1 receives a respective one of IF signals $212_1$-$212_N$ from transmitter branch 290 during a transmit operation, and applies a respective one of IF signals $213_1$-$213_N$ to a receiver branch 291 during a receive operation. Stage S-2 performs up- and down conversion of electrical signals between radio frequencies and mmW frequencies using a LO signal 808. As such, stage S-2 receives an electrical mmW signal $805_i$ from antenna $202_i$ during a receive operation, and applies an electrical mmW signal $804_i$ to antenna $202_i$ during a transmit operation. An example embodiment of channel module $806_i$ is described in more detail below in reference to FIG. 10.

Circuit 800 further comprises a frequency multiplier 870 and a filter 874 that operate to generate LO signal 808 based on master-clock signal 262 (see FIG. 2). In an example embodiment, frequency multiplier 870 can be a non-linear circuit configured to nonlinearly distort the waveform of master-clock signal 262 in a manner that causes a designated one of the high-order harmonics of that signal to be relatively prominent in a resulting distorted waveform 872. For example, frequency multiplier 870 can operate to cause the $P_0$-th harmonic to be relatively prominent, as indicated in FIG. 8 by the shown multiplication factor "$\times P_0$". In some embodiment, the multiplication factor $P_0$ can be an integer value. Alternative embodiments in which the multiplication factor $P_0$ is a mixed fractional value (>1) are also possible.

Filter 874 is configured to generate LO signal 808 by passing through the above-described relatively prominent frequency component of waveform 872, while stopping, attenuating, and/or rejecting the other frequency components thereof. In an example embodiment, filter 874 can be implemented as a band-pass filter.

Figure 9A:
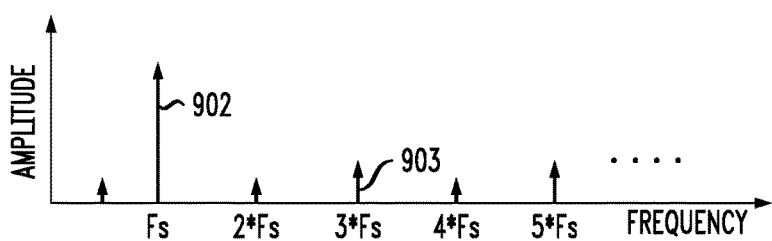
FIGS. 9A-9D graphically illustrate certain frequency characteristics of the analog electrical circuit of FIG. 8 according to an embodiment.
Figure 9B:
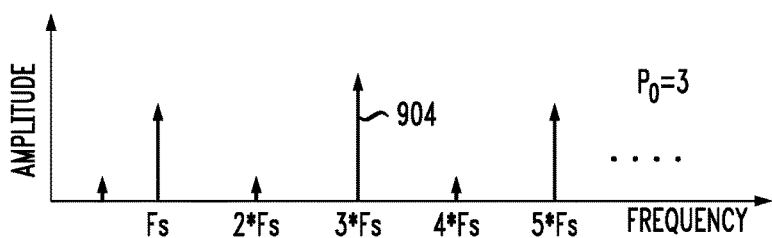
Figure 9C:
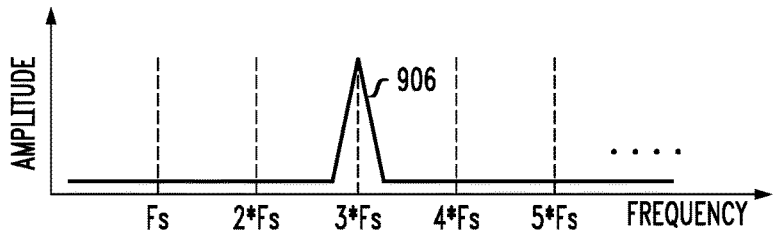
Figure 9D:
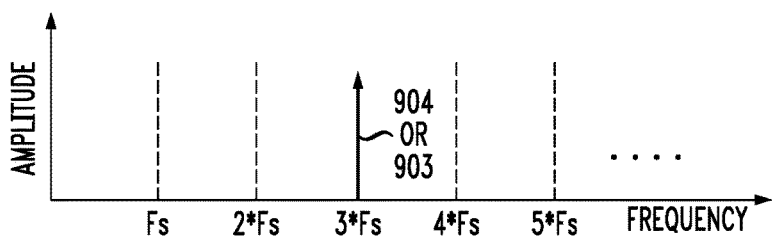

FIGS. 9A-9D graphically illustrate certain frequency characteristics of analog electrical circuit 800 (FIG. 8) according to an embodiment. More specifically, FIG. 9A graphically shows an example spectrum of master-clock signal 262. FIG. 9B graphically shows an example spectrum of waveform 872. FIG. 9C graphically shows example band-pass characteristics of filter 874. FIG. 9D graphically shows an example spectrum of LO signal 808.

Referring to FIG. 9A, the fundamental frequency of master-clock signal 262 is labeled $F_s$. The spectrum of master-clock signal 262 typically includes (i) a fundamental-frequency component 902, (ii) several higher-order components, such as a third order component 903, all located at integer multiples of the frequency $F_s$, and (iii) one or more sub-harmonics of the frequency $F_s$, each located at a respective lower frequency.

Referring to FIG. 9B, a relatively prominent frequency component 904 of waveform 872 is located at the frequency $3F_s$, which corresponds to an embodiment of frequency multiplier 870 with $P_0=3$. Waveform 872 also has additional (less-prominent) frequency components located at other frequencies, e.g., as indicated in FIG. 9B.

Referring to FIG. 9C, a curve 906 represents transmission characteristics of filter 874. As shown, filter 874 has a pass-band centered at the frequency $3F_s$.

Referring to FIG. 9D, the pass-band of filter 874 (FIG. 9C) causes frequency component 904 of waveform 872 to pass through the filter, whereas other components of the waveform are stopped or rejected. As a result, LO signal 808 has a frequency of $3F_s$ corresponding to $P_0=3$.

In an alternative embodiment of circuit 800, frequency multiplier 870 can be omitted. In this case, the pass-band of filter 874 (FIG. 9C) causes frequency component 903 of master-clock signal 262 (FIG. 9A) to pass through the filter, whereas other components of the master-clock signal are stopped or rejected. An optional amplifier (not shown in FIG. 8) may then be used to amplify the passed frequency component 903 to generate LO signal 808 as shown in FIG. 9D.

In some embodiments, some or all frequency dividers $270_0$-$270_{N+1}$ (FIG. 2) can be configured to receive, as their input signal, a copy of LO signal 808 instead of master-clock signal 262 (see FIGS. 2 and 8). In these embodiments, LO signal $208_i$ will have a frequency corresponding to the effective fractional division factor of $P_0/L_i$. Such embodiments might be beneficial if the number N is relatively large, e.g., because these embodiments can increase the flexibility of the LO-generation scheme, simplify the development of the corresponding LO-frequency plan, and largely eliminate fractional spurs in the output signal(s).

Figure 10:
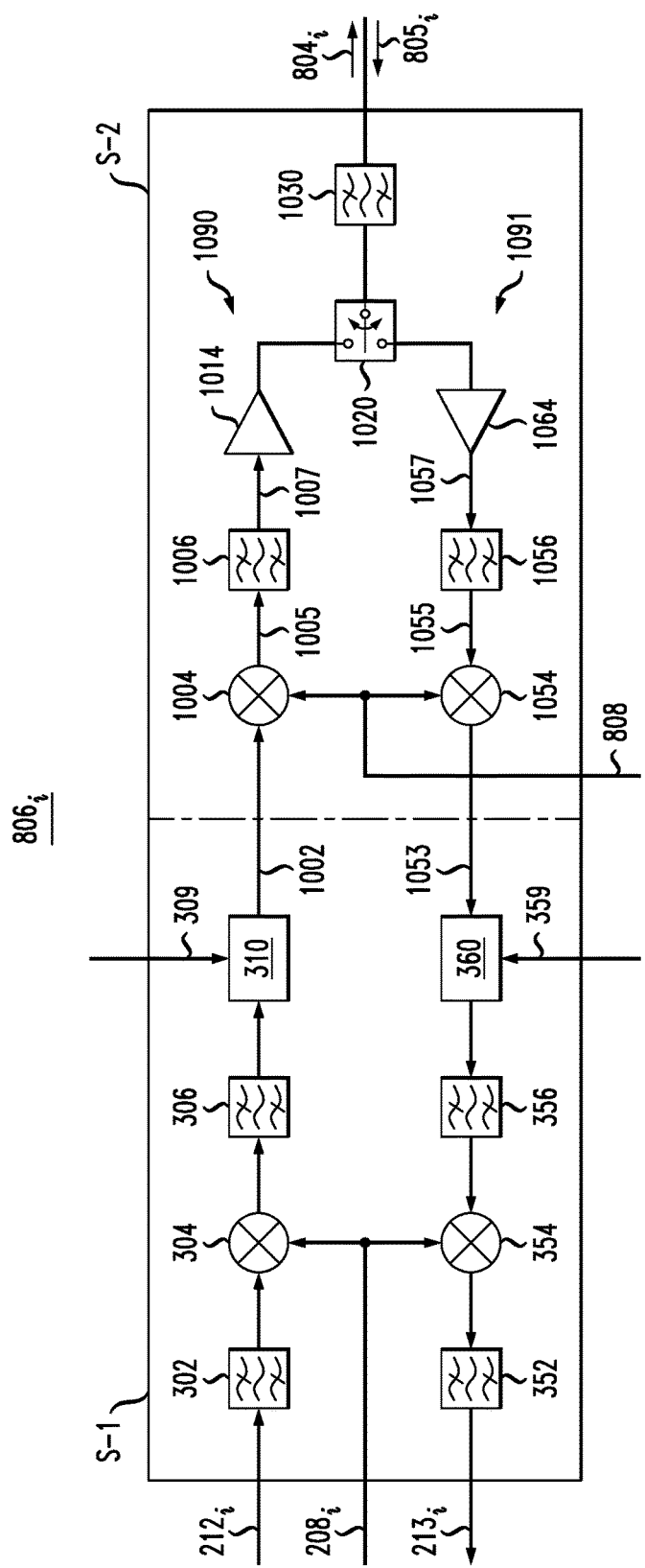
FIG. 10 shows a block diagram of a channel module that can be used in the analog electrical circuit of FIG. 8 according to an embodiment.

FIG. 10 shows a block diagram of channel module $806_i$ that can be used in mmW front end 810 (FIG. 8) according to an embodiment. Channel module $806_i$ has a switch 1020 that connects antenna $202_i$, by way of a band-pass filter 1030, to either a transmit branch 1090 or a receive branch 1091 of that channel module. Both transmit branch 1090 and receive branch 1091 run through stages S-1 and S2, as indicated in FIG. 10.

Stage S-1 employs many of the same circuit elements as channel module $206_i$ of FIG. 3. More specifically, the S-1 portion of transmit branch 1090 includes band-pass filters 302 and 306, mixer 304, and weighting block 310 (also see FIG. 3). The S-1 portion of receive branch 1091 includes band-pass filters 352 and 356, mixer 354, and weighting block 360. These circuit elements are already described above in reference to FIG. 3, and this description is not repeated here.

The S-2 portion of transmit branch 1090 includes a mixer 1004, a band-pass filter 1006, and an amplifier 1014. During a transmit phase of the corresponding TDD scheme, mixer 1004 mixes an electrical RF signal 1002 received from stage S-1 with LO signal 808 to generate a mixed signal 1005. Band-pass filter 1006 then selects an mmW sub-band 1007 of mixed signal 1005 corresponding to the sum frequency of RF signal 1002 and LO signal 808 or the difference frequency of the LO signal 808 and the RF signal 1002, e.g., based on the selected frequency plan, thereby completing the up-conversion process from RF to mmW. Amplifier 1014 and band-pass filter 1030 then appropriately condition electrical mmW signal 1007 to generate electrical mmW signal $804_i$ applied to antenna $202_i$.

The S-2 portion of receive branch 1091 includes a mixer 1054, a band-pass filter 1056, and an amplifier 1064. During a receive phase of the corresponding TDD scheme, band-pass filter 1030 and amplifier 1064 appropriately condition electrical mmW signal $805_i$ generated by antenna $202_i$ in response to received mmW radiation to generate an electrical mmW signal 1057. Band-pass filter 1056 then selects a sub-band 1055 of electrical mmW signal 1057 for down-conversion to RF. Mixer 1054 mixes sub-band 1055 with LO signal 808 to generate a mixed signal 1053 that is then directed to stage S-1 for further processing therein.

Note that, in various embodiments, both "high-side injection" and/or "low-side injection" frequency up-converter and down-converter options can be implemented in channel module $806_i$.

Figure 11:
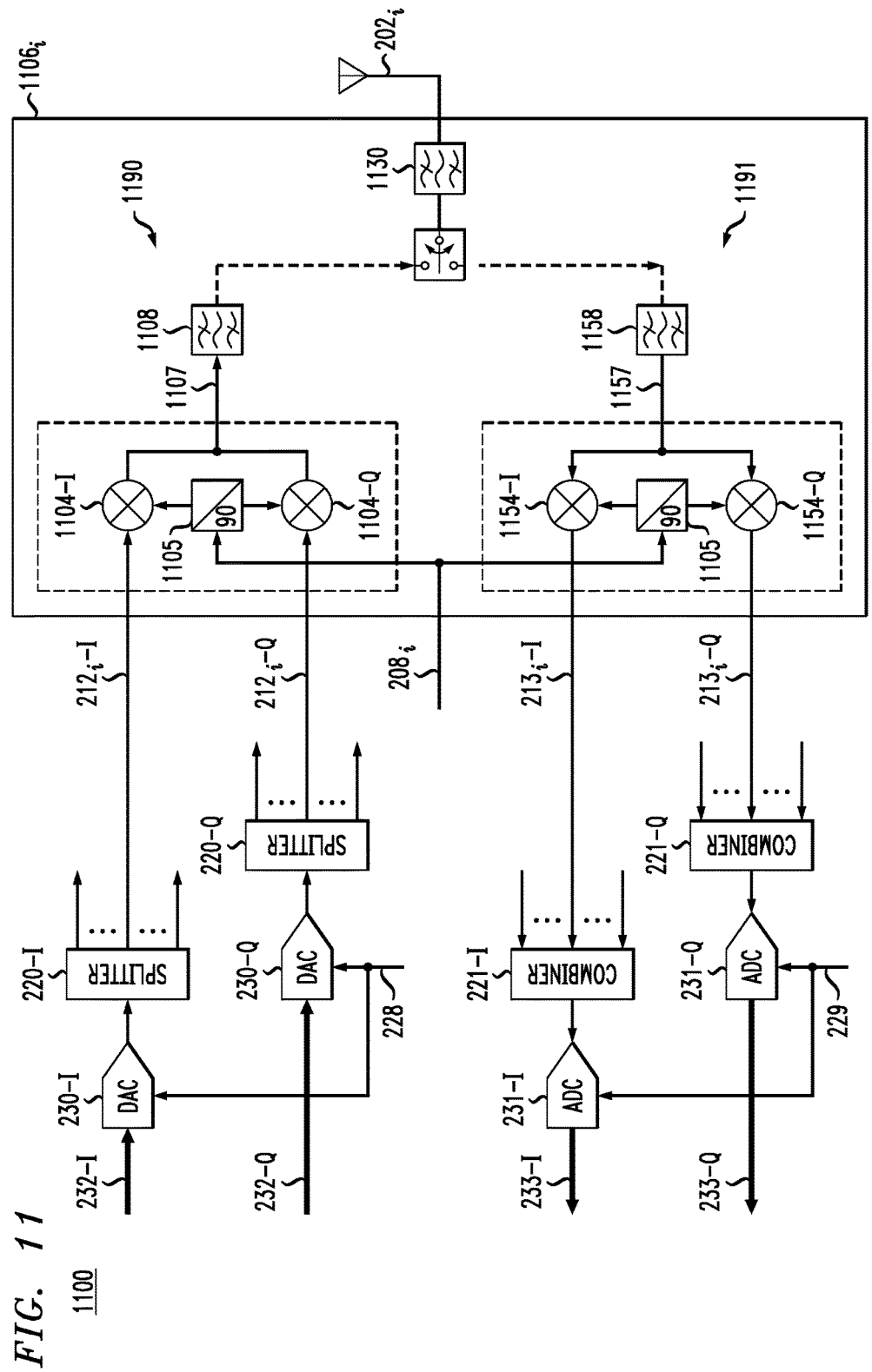
FIG. 11 shows a block diagram of an electrical circuit that can be used in the wireless transceiver of FIG. 2 according to another alternative embodiment.

FIG. 11 shows a block diagram of an electrical circuit 1100 that can be used in wireless transceiver 200 (FIG. 2) according to another alternative embodiment. More specifically, circuit 1100 can be used to modify wireless transceiver 200 to make it compatible with an I-Q modulation format.

Although only one I-Q channel is illustrated in FIG. 11, a person of ordinary skill in the art will understand how to make and use additional I-Q channels without undue experimentation.

Circuit 1100 comprises an I-Q channel module $1106_i$ operatively connected to antenna $202_i$, splitters 220-I and 220-Q, and combiners 221-I and 221-Q, as indicated in FIG. 11. Channel module $1106_i$ also receives LO signal $208_i$. Each of LO splitters 1105 used in channel module $1106_i$ generates two respective copies of LO signal $208_i$ with a relative phase shift of 90 degrees. In a transmit branch 1190 of channel module $1106_i$, one of these two respective copies is applied to a mixer 1104-I while the other is applied to a mixer 1104-Q. Mixers 1104-I and 1104-Q use the received copies of LO signal $208_i$ to up-convert IF signals $212_i$-I and $212_i$-Q, respectively, to RF. The resulting up-converted signals are combined to generate an electrical IQ-modulated signal 1107 that is then filtered in filters 1108 and 1130 and applied to antenna $202_i$ during a transmit phase of the corresponding TDD scheme.

In a receive branch 1191 of channel module $1106_i$, one of the two copies of LO signal $208_i$ generated by LO splitter 1105 is applied to a mixer 1154-I while the other is applied to a mixer 1154-Q. Mixers 1154-I and 1154-Q use the received copies of LO signal $208_i$ to down-convert an electrical RF signal 1157 received by way of filters 1130 and 1158 from antenna $202_i$ during a receive phase of the corresponding TDD scheme. The resulting electrical IF signals $213_i$-I and $213_i$-Q are directed to combiners 221-I and 221-Q, respectively, whose outputs are then applied to ADCs 221-I and 221-Q to generate digital IF signals 233-I and 233-Q as indicated in FIG. 11.

Figure 12B:
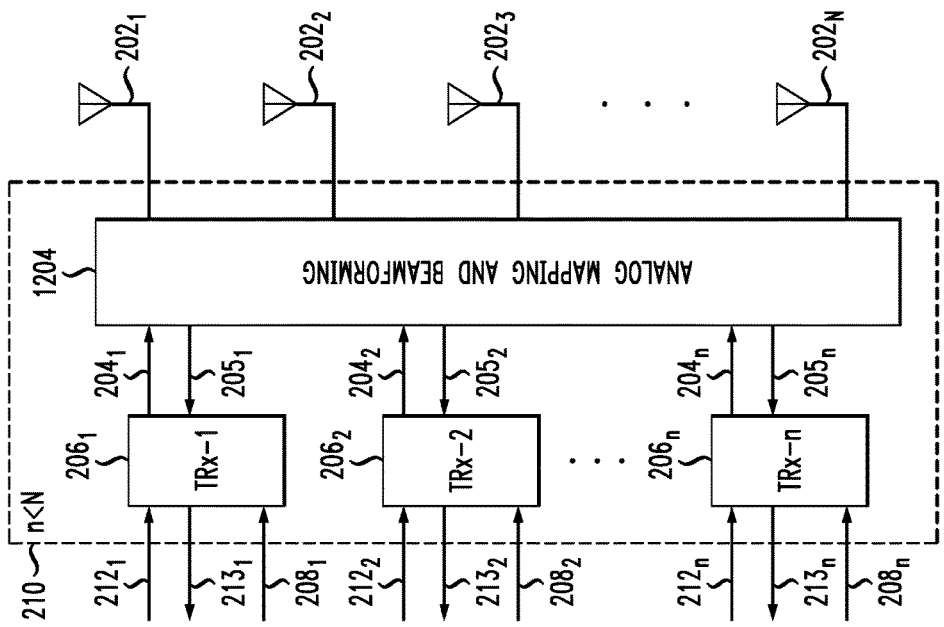
FIGS. 12A-12B show block diagrams of analog and digital circuits that can be used in the wireless transceiver of FIG. 2 according to yet another alternative embodiment.
Figure 12A:
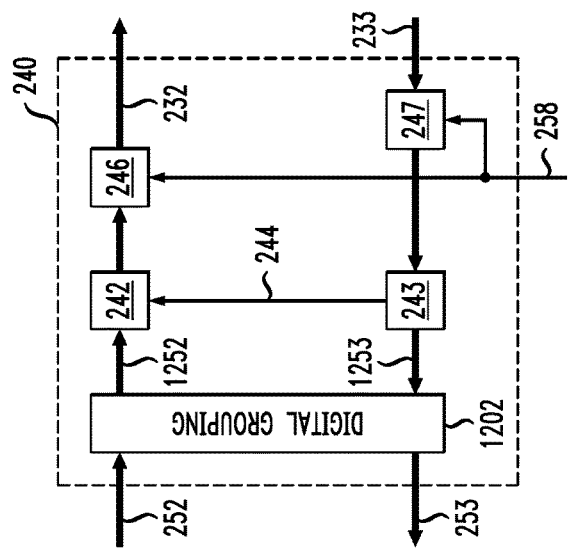

FIGS. 12A-12B show block diagrams of analog and digital circuits that can be used in wireless transceiver 200 (FIG. 2) according to yet another alternative embodiment. More specifically, FIG. 12A illustrates possible modifications to digital signal processor 240 (FIG. 2). FIG. 12B illustrates the corresponding modifications to RF front end 210 (FIG. 2). The modifications shown in FIGS. 12A-12B enable the corresponding embodiment of wireless transceiver 200 to perform beam-forming operations, e.g., using a suitable composite (analog-digital) beam-forming algorithm. Example beam-forming algorithms suitable for this purpose are disclosed, e.g., in the following publications: (1) Ansuman Adhikary, Junyoung Nam, Jae-Young Ahn, and Giuseppe Caire, "Joint Spatial Division and Multiplexing—The Large Scale Array Regime," IEEE TRANSACTIONS ON INFORMATION THEORY, VOL. 59, NO. 10, October 2013; and (2) Omar El Ayach, Sridhar Rajagopal, Shadi Abu-Surra, Zhouyue Pi and Robert W. Heath, "Spatially Sparse Precoding in Millimeter Wave MIMO Systems," IEEE TRANSACTIONS ON WIRELESS COMMUNICATIONS, VOL. 13, NO. 3, March 2014, both of which are incorporated herein by reference in their entirety.

The beamforming implemented using an embodiment of wireless transceiver 200 corresponding to FIGS. 12A-12B relies on the fact that, based on statistical RF channel knowledge for a typical cellular configuration, the RF channels from N base-station antennas 104 to any UE antenna 106 or 108 (see FIG. 1) are correlated and can be combined into n groups (n<N), thereby enabling a reduction in the number of transmit/receive chains used in the corresponding wireless transceiver from N to n. The channel correlation can be especially high at the mmW channel frequencies. After channel grouping is accomplished, pre-coding of the n groups of RF channels can be performed on the group basis in the digital domain, and then the phase-shift vector (final beamforming) can be applied to each RF-signal path in the analog domain.

As shown in FIG. 12A, digital signal processor 240 comprises a digital grouping module 1202. During a transmit phase, module 1202 groups N transmit signals into n groups using a selected grouping algorithm. Digital circuits 242 and 246 then operate on a resulting digital signal 1252 instead of digital input signal 252 to feed n transmit chains connected to n (<N) channel modules $206_1$-$206_n$ in RF front end 210 shown in FIG. 12B. RF front end 210 includes an analog mapping (un-grouping) and beamforming module 1204 that processes the corresponding n electrical RF signals $204_1$-$204_n$ received from channel modules $206_1$-$206_n$ to generate a corresponding set of N electrical RF signals for antennas $202_1$-$202_N$, with the processing and generation being performed based on the same selected grouping algorithm that is used in module 1202 (FIG. 12A).

During a receive phase, modules 1204 and 1202 perform signal-processing functions that are inverse of those performed during a transmit phase. More specifically, module 1204 (FIG. 12B) processes the N electrical RF signals received from antennas $202_1$-$202_N$ to generate the corresponding n electrical RF signals $205_1$-$205_n$, with the processing and generation being performed based on the same beam-forming algorithm as that used during the transmit phase. Module 1202 (FIG. 12A) then un-groups a corresponding digital receive signal 1253 to generate composite output signal 253 corresponding to N receive signals.

Figure 13A:
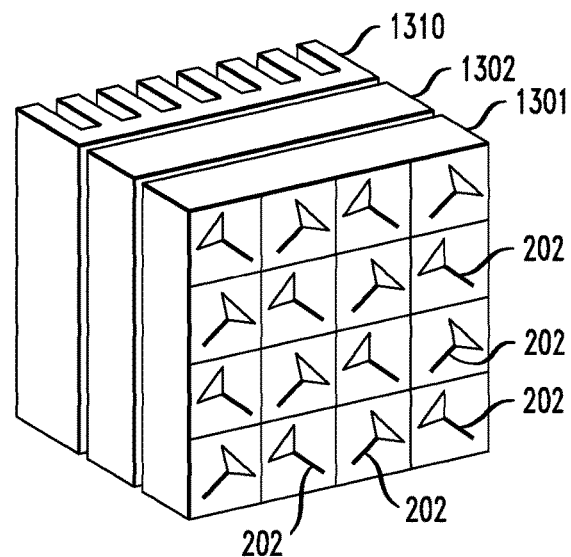
FIGS. 13A-13B illustrate a packaged transceiver module according to an embodiment.
Figure 13B:
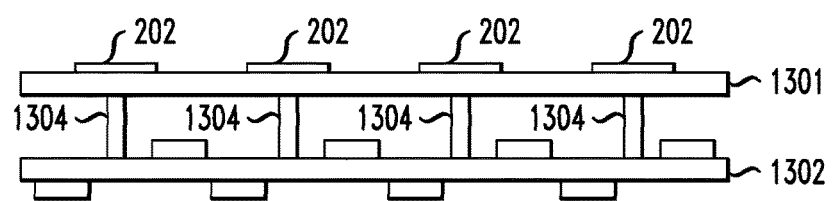

FIGS. 13A-13B illustrate a packaged transceiver module 1300 according to an embodiment. More specifically, FIG. 13A shows a three-dimensional perspective view of module 1300. FIG. 13B shows a partial side view of module 1300.

Module 1300 comprises a first board or substrate 1301 having a plurality of antennas 202 (also see FIG. 2). In various embodiments, antennas 202 can be arranged on the first board or substrate 1301 in a linear array, a square array, a rectangular array, or any other suitable geometric pattern.

Module 1300 further comprises a second board or substrate 1302 having other circuits of wireless transceiver 200, such as DSP 240, DAC 230, ADC 231, clock generator 260, dividers 270, filters 280, 281, and 274, channel modules 206, etc. Antennas 202 located on the first board or substrate 1301 are electrically connected to the circuits located on the second board or substrate 1302 by way of feeders 1304 (FIG. 13B). A heat sink 1310 is attached to the circuits located on the second board or substrate 1302, e.g., as indicated in FIG. 13A, in a manner that enables efficient heat dissipation.

In some embodiments, any selected number of modules 1300 can be electrically and/or structurally connected or integrated in any suitable geometric and/or hierarchical arrangement to form a larger wireless transceiver, e.g., an M-MIMO transceiver.

In some embodiments corresponding to the (relatively low) mmW frequencies, antennas 202 can be placed on the surface of the circuit chip.

In some embodiments, at least some of the circuits of wireless transceiver 200 can be integrated together, forming an integrated circuit (IC) or a chip set. Different sub-circuits on a chip can be appropriately isolated from one another using the silicon-on-insulator (SoI) technology. In various embodiments, the various IC devices of a chip set can be combined and packaged in various ways. For example, a chip set can have a digital IC (e.g., an FPGA implementing a DSP), a mixed-signal IC (e.g., including a DAC, an ADC, and a clock generator), and an RF IC (e.g., including an RF front end). Various ICs can be fabricated using the monolithic or multi-chip technology. In an example embodiment, the circuit integration can be performed in a manner that helps to reduce the size and/or cost of the wireless transceiver, and possibly to improve its reliability in field conditions.

According to an example embodiment disclosed above in reference to FIGS. 1-13, provided is an apparatus (e.g., 200, FIG. 2) comprising: a plurality of first mixers (e.g., 304, FIG. 3 or 10), each one of the plurality of first mixers being configured to mix a respective one of a plurality of first analog IF signals (e.g., 303, FIG. 3) and a respective one of a plurality of electrical LO signals (e.g., $208_1$-$208_N$, FIG. 2 or 3; 408, FIG. 4) to generate a respective one of a plurality of first electrical RF signals (e.g., 305, FIG. 3), each electrical LO signal of the plurality of LO signals having a different respective frequency; a plurality of second mixers (e.g., 354, FIG. 3 or 10), each one of the plurality of second mixers being configured to mix a respective one of a plurality of second electrical RF signals (e.g., 355, FIG. 3) and a respective one of the plurality of electrical LO signals to generate a respective one of a plurality of second analog IF signals (e.g., 355, FIG. 3)$_i$ and a plurality of frequency dividers (e.g., $270_1$-$270_N$, FIG. 2; 470, FIG. 4) configured to frequency divide a master-clock signal (e.g., 262, FIGS. 2, 4) to generate the plurality of electrical LO signals of different frequencies.

In some embodiments of the above apparatus, the apparatus further comprises: a plurality of antennas (e.g., $202_1$-$202_N$, FIG. 2); and a plurality of channel modules (e.g., $206_1$-$206_N$, FIGS. 2, 3, 4; $806_1$-$806_N$, FIGS. 8, 10), each operatively coupled to a respective one of the plurality of antennas. Each one of the plurality of channel modules includes a respective one of the plurality of first mixers and a respective one of the plurality of second mixers.

In some embodiments of any of the above apparatus, in each one of the plurality of channel modules: the respective one of the plurality of electrical LO signals applied to the respective one of the plurality of first mixers is a first copy of a corresponding LO signal (e.g., $208_i$, FIG. 3), said corresponding LO signal being one of the plurality of electrical LO signals; and the respective one of the plurality of electrical LO signals applied to the respective one of the plurality of second mixers is a second copy of said corresponding LO signal.

In some embodiments of any of the above apparatus, the apparatus further comprises: a signal combiner (e.g., 221, FIG. 2) configured to combine the plurality of second analog IF signals to generate a combined electrical signal; and an analog-to-digital converter (ADC) (e.g., 231, FIG. 2) configured to convert the combined electrical signal into a corresponding digital IF signal (e.g., 233, FIG. 2) carrying a sequence of discrete digital samples generated by the ADC at a sampling rate determined by a sampling-clock signal (e.g., 229, FIG. 2). The plurality of frequency dividers includes a frequency divider (e.g., $270_{N+1}$, FIG. 2) configured to frequency divide the master-clock signal to generate the sampling-clock signal.

In some embodiments of any of the above apparatus, the signal combiner comprises a frequency multiplexer.

In some embodiments of any of the above apparatus, the apparatus further comprises: a digital-to-analog converter (DAC) (e.g., 230, FIG. 2) configured to convert a first digital IF signal (e.g., 232, FIG. 2) into a corresponding analog IF signal using a first sampling rate determined by a first sampling-clock signal (e.g., 228, FIG. 2); and a signal splitter (e.g., 220, FIG. 2) configured to split said corresponding analog IF signal to generate the plurality of first analog IF signals. The plurality of frequency dividers includes a frequency divider (e.g., $270_0$, FIG. 2) configured to frequency divide the master-clock signal to generate the first sampling-clock signal.

In some embodiments of any of the above apparatus, the signal splitter comprises a frequency de-multiplexer (e.g., as illustrated by the spectra of FIGS. 7D-7G).

In some embodiments of any of the above apparatus, the apparatus further comprises: a signal combiner (e.g., 221, FIG. 2) configured to combine the plurality of second analog IF signals to generate a combined electrical signal; and an analog-to-digital converter (ADC) (e.g., 231, FIG. 2) configured to convert the combined electrical signal into a second digital IF signal (e.g., 233, FIG. 2) carrying a sequence of discrete digital samples generated by the ADC at a second sampling rate determined by a second sampling-clock signal (e.g., 229, FIG. 2). The plurality of frequency dividers includes a frequency divider (e.g., $270_{N+1}$, FIG. 2) configured to frequency divide the master-clock signal to generate the second sampling-clock signal.

In some embodiments of any of the above apparatus, the apparatus further comprises: a first clock generator (e.g., 260, FIG. 2) configured to generate the master-clock signal; and a second clock generator (e.g., 256, FIG. 2) configured to generate a digital reference-clock signal (e.g., 258, FIG. 2). The first clock generator is configured to generate the master-clock signal in response to receiving the digital reference-clock signal.

In some embodiments of any of the above apparatus, the apparatus further comprises: a digital up-converter (e.g., 242/246, FIG. 2 or 6) configured to digitally translate a digital baseband signal (e.g., 252, FIG. 2), using the digital reference-clock signal, to generate the first digital IF signal; and a digital down-converter (e.g., 247/243, FIG. 2 or 5) configured to digitally translate the second digital IF signal to baseband using the digital reference-clock signal.

In some embodiments of any of the above apparatus, the apparatus further comprises: a plurality of third mixers (e.g., 1004, FIG. 10), each one of the plurality of third mixers being configured to mix a respective one of the plurality of first electrical RF signals (e.g., 303, FIG. 3) and an additional electrical LO signal (e.g., 808, FIG. 10) to generate a respective one of a plurality of first millimeter-wave (mmW) signals (e.g., $804_1$-$804_N$, FIG. 10); a plurality of fourth mixers (e.g., 1054, FIG. 10), each one of the plurality of fourth mixers being configured to mix a respective one of a plurality of second electrical mmW signals (e.g., $805_1$-$805_N$, FIG. 10) and the additional electrical LO signal to generate a respective one of the plurality of second electrical RF signals; and a frequency multiplier (e.g., 870, FIG. 8) configured to frequency multiply the master-clock signal to generate the additional electrical LO signal.

In some embodiments of any of the above apparatus, the apparatus further comprises: a plurality of antennas (e.g., $202_1$-$202_N$, FIG. 2); and a plurality of channel modules (e.g., $806_1$-$806_N$, FIGS. 8, 10), each operatively coupled to a respective one of the plurality of antennas. Each one of the plurality of channel modules includes a respective one of the plurality of first mixers, a respective one of the plurality of second mixers, a respective one of the plurality of third mixers, and a respective one of the plurality of fourth mixers.

In some embodiments of any of the above apparatus, the apparatus further comprises: a first clock generator (e.g., 260, FIG. 2) configured to generate the master-clock signal; and a second clock generator (e.g., 256, FIG. 2) configured to generate a digital reference-clock signal (e.g., 258, FIG. 2). The first clock generator is configured to generate the master-clock signal in response to receiving the digital reference-clock signal.

In some embodiments of any of the above apparatus, the apparatus further comprises: a digital up-converter (e.g., 242/246, FIG. 2 or 6) configured to digitally translate a digital baseband signal (e.g., 252, FIG. 2), using the digital reference-clock signal, to generate a first digital IF signal (e.g., 232, FIG. 2); and a digital down-converter (e.g., 247/243, FIG. 2 or 5) configured to digitally translate a second digital IF signal (e.g., 233, FIG. 2) to baseband using the digital reference-clock signal. The apparatus is configured to generate the plurality of first analog IF signals using the first digital IF signal. The apparatus is further configured to generate the second digital IF signal using the plurality of second analog IF signals.

In some embodiments of any of the above apparatus, the digital down-converter comprises: a plurality of numerically controlled oscillators (e.g., $514_1$-$514_N$, FIG. 5) configured to generate a plurality of digital LO signals (e.g., $516_1$-$516_N$, FIG. 5) in response to receiving the digital reference-clock signal; and a plurality of digital mixers (e.g., $520_1$-$520_N$, FIG. 5), each configured to mix a respective portion of the second digital IF signal and a respective one of the plurality of digital LO signals to generate a respective one of a plurality of digital baseband signals (e.g., $532_1$-$532_N$, FIG. 5).

In some embodiments of any of the above apparatus, the apparatus further comprises: a plurality of weighting circuits (e.g., $540_1$-$540_N$, FIG. 5), each configured to apply a respective weighting coefficient (e.g., $538_i$, FIG. 5) to the respective one of the plurality of digital baseband signals to generate a respective one of a plurality of weighted digital baseband signals; and a digital combiner (e.g., 550, FIG. 5) configured to apply a MIMO algorithm to combine the plurality of weighted digital baseband signals to generate a corresponding composite digital output signal (e.g., 253, FIG. 5).

In some embodiments of any of the above apparatus, the digital up-converter comprises: a plurality of first numerically controlled oscillators (e.g., $626_1$-$626_N$, FIG. 6) configured to generate a plurality of first digital LO signals (e.g., $628_1$-$628_N$, FIG. 6) in response to receiving the digital reference-clock signal; and a plurality of first digital mixers (e.g., $630_1$-$630_N$, FIG. 6), each configured to mix a respective one of a plurality of first digital baseband signals (e.g., $622_1$-$622_N$, FIG. 6) and a respective one of the plurality of first digital LO signals to generate a respective portion (e.g., $640_i$, FIG. 6) of the first digital IF signal.

In some embodiments of any of the above apparatus, the digital down-converter comprises: a plurality of second numerically controlled oscillators (e.g., $514_1$-$514_N$, FIG. 5) configured to generate a plurality of second digital LO signals (e.g., $516_1$-$516_N$, FIG. 5) in response to receiving the digital reference-clock signal; and a plurality of second digital mixers (e.g., $520_1$-$520_N$, FIG. 5), each configured to mix a respective portion of the second digital IF signal and a respective one of the plurality of second digital LO signals to generate a respective one of a plurality of digital baseband signals (e.g., $532_1$-$532_N$, FIG. 5).

In some embodiments of any of the above apparatus, the digital up-converter further comprises: a digital splitter (e.g., 610, FIG. 6) configured to split the digital baseband signal into a corresponding plurality of portions (e.g., $612_1$-$612_N$, FIG. 6); and a plurality of weighting circuits (e.g., $620_1$-$620_N$, FIG. 6), each configured to apply a respective weighting coefficient (e.g., $618_i$, FIG. 6) to the respective one of said corresponding plurality of portions to generate the respective one of the plurality of first digital baseband signals.

In some embodiments of any of the above apparatus, the digital up-converter further comprises a controller (e.g., 560/616, FIGS. 5-6) configured to set values of the respective weighting coefficients based on estimated channel-state information (e.g., 552, FIG. 5).

While this disclosure includes references to illustrative embodiments, this specification is not intended to be construed in a limiting sense. Various modifications of the described embodiments, as well as other embodiments within the scope of the disclosure, which are apparent to persons skilled in the art to which the disclosure pertains are deemed to lie within the principle and scope of the disclosure, e.g., as expressed in the following claims.

Unless explicitly stated otherwise, each numerical value and range should be interpreted as being approximate as if the word "about" or "approximately" preceded the value or range.

It will be further understood that various changes in the details, materials, and arrangements of the parts which have been described and illustrated in order to explain the nature of this disclosure may be made by those skilled in the art without departing from the scope of the disclosure, e.g., as expressed in the following claims.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the disclosure. The appearances of the phrase "in one embodiment" in various places in the specification are not necessarily all referring to the same embodiment, nor are separate or alternative embodiments necessarily mutually exclusive of other embodiments. The same applies to the term "implementation."

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

The described embodiments are to be considered in all respects as only illustrative and not restrictive. In particular, the scope of the disclosure is indicated by the appended claims rather than by the description and figures herein. All changes that come within the meaning and range of equivalency of the claims are to be embraced within their scope.

The description and drawings merely illustrate the principles of the disclosure. It will thus be appreciated that those of ordinary skill in the art will be able to devise various arrangements that, although not explicitly described or shown herein, embody the principles of the disclosure and are included within its spirit and scope. Furthermore, all examples recited herein are principally intended expressly to be only for pedagogical purposes to aid the reader in understanding the principles of the disclosure and the concepts contributed by the inventor(s) to furthering the art, and are to be construed as being without limitation to such specifically recited examples and conditions. Moreover, all statements herein reciting principles, aspects, and embodiments of the disclosure, as well as specific examples thereof, are intended to encompass equivalents thereof.

The functions of the various elements shown in the figures, including any functional blocks labeled as "processors," may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included.

It should be appreciated by those of ordinary skill in the art that any block diagrams herein represent conceptual views of illustrative circuitry embodying the principles of the disclosure.

What is claimed is:

1. An apparatus comprising:
a plurality of first mixers, each one of the plurality of first mixers being configured to mix a respective one of a plurality of first analog intermediate-frequency (IF) signals and a respective one of a plurality of electrical local-oscillator (LO) signals to generate a respective one of a plurality of first electrical radio-frequency (RF) signals, each electrical LO signal of the plurality of LO signals having a different respective frequency;
a plurality of second mixers, each one of the plurality of second mixers being configured to mix a respective one of a plurality of second electrical RF signals and a respective one of the plurality of electrical LO signals to generate a respective one of a plurality of second analog IF signals; and
a plurality of frequency dividers configured to frequency divide a master-clock signal to generate the plurality of electrical LO signals of different frequencies.

2. The apparatus of claim 1, further comprising:
a plurality of antennas; and
a plurality of channel modules, each operatively coupled to a respective one of the plurality of antennas; and
wherein each one of the plurality of channel modules includes a respective one of the plurality of first mixers and a respective one of the plurality of second mixers.

3. The apparatus of claim 2, wherein, in each one of the plurality of channel modules:
the respective one of the plurality of electrical LO signals applied to the respective one of the plurality of first mixers is a first copy of a corresponding LO signal, said corresponding LO signal being one of the plurality of electrical LO signals; and
the respective one of the plurality of electrical LO signals applied to the respective one of the plurality of second mixers is a second copy of said corresponding LO signal.

4. The apparatus of claim 1, further comprising:
a signal combiner configured to combine the plurality of second analog IF signals to generate a combined electrical signal; and
an analog-to-digital converter (ADC) configured to convert the combined electrical signal into a corresponding digital IF signal carrying a sequence of discrete digital samples generated by the ADC at a sampling rate determined by a sampling-clock signal; and
wherein the plurality of frequency dividers includes a frequency divider configured to frequency divide the master-clock signal to generate the sampling-clock signal.

5. The apparatus of claim 4, wherein the signal combiner comprises a frequency multiplexer.

6. The apparatus of claim 1, further comprising:
a digital-to-analog converter (DAC) configured to convert a first digital IF signal into a corresponding analog IF signal using a first sampling rate determined by a first sampling-clock signal; and
a signal splitter configured to split said corresponding analog IF signal to generate the plurality of first analog IF signals; and
wherein the plurality of frequency dividers includes a frequency divider configured to frequency divide the master-clock signal to generate the first sampling-clock signal.

7. The apparatus of claim 6, wherein the signal splitter comprises a frequency de-multiplexer.

8. The apparatus of claim 6, further comprising:
a signal combiner configured to combine the plurality of second analog IF signals to generate a combined electrical signal; and
an analog-to-digital converter (ADC) configured to convert the combined electrical signal into a second digital IF signal carrying a sequence of discrete digital samples generated by the ADC at a second sampling rate determined by a second sampling-clock signal; and
wherein the plurality of frequency dividers includes a frequency divider configured to frequency divide the master-clock signal to generate the second sampling-clock signal.

9. The apparatus of claim 8, further comprising:
a first clock generator configured to generate the master-clock signal; and
a second clock generator configured to generate a digital reference-clock signal; and
wherein the first clock generator is configured to generate the master-clock signal in response to receiving the digital reference-clock signal.

10. The apparatus of claim 9, further comprising:
a digital up-converter configured to digitally translate a digital baseband signal, using the digital reference-clock signal, to generate the first digital IF signal; and
a digital down-converter configured to digitally translate the second digital IF signal to baseband using the digital reference-clock signal.

11. The apparatus of claim 1, further comprising:
a plurality of third mixers, each one of the plurality of third mixers being configured to mix a respective one of the plurality of first electrical RF signals and an additional electrical LO signal to generate a respective one of a plurality of first millimeter-wave (mmW) signals;
a plurality of fourth mixers, each one of the plurality of fourth mixers being configured to mix a respective one of a plurality of second electrical mmW signals and the additional electrical LO signal to generate a respective one of the plurality of second electrical RF signals; and
a frequency multiplier configured to frequency multiply the master-clock signal to generate the additional electrical LO signal.

12. The apparatus of claim 11, further comprising:
a plurality of antennas; and
a plurality of channel modules, each operatively coupled to a respective one of the plurality of antennas; and
wherein each one of the plurality of channel modules includes a respective one of the plurality of first mixers, a respective one of the plurality of second mixers, a respective one of the plurality of third mixers, and a respective one of the plurality of fourth mixers.

13. The apparatus of claim 1, further comprising:
a first clock generator configured to generate the master-clock signal; and
a second clock generator configured to generate a digital reference-clock signal; and
wherein the first clock generator is configured to generate the master-clock signal in response to receiving the digital reference-clock signal.

14. The apparatus of claim 13, further comprising:
a digital up-converter configured to digitally translate a digital baseband signal, using the digital reference-clock signal, to generate a first digital IF signal; and
a digital down-converter configured to digitally translate a second digital IF signal to baseband using the digital reference-clock signal;
wherein the apparatus is configured to generate the plurality of first analog IF signals using the first digital IF signal; and
wherein the apparatus is further configured to generate the second digital IF signal using the plurality of second analog IF signals.

15. The apparatus of claim 14, wherein the digital down-converter comprises:
a plurality of numerically controlled oscillators configured to generate a plurality of digital LO signals in response to receiving the digital reference-clock signal; and
a plurality of digital mixers, each configured to mix a respective portion of the second digital IF signal and a respective one of the plurality of digital LO signals to generate a respective one of a plurality of digital baseband signals.

16. The apparatus of claim 15, further comprising:
a plurality of weighting circuits, each configured to apply a respective weighting coefficient to the respective one of the plurality of digital baseband signals to generate a respective one of a plurality of weighted digital baseband signals; and
a digital combiner configured to apply a multiple-input/multiple-output (MIMO) algorithm to combine the plurality of weighted digital baseband signals to generate a corresponding composite digital output signal.

17. The apparatus of claim 14, wherein the digital up-converter comprises:
a plurality of first numerically controlled oscillators configured to generate a plurality of first digital LO signals in response to receiving the digital reference-clock signal; and
a plurality of first digital mixers, each configured to mix a respective one of a plurality of first digital baseband signals and a respective one of the plurality of first digital LO signals to generate a respective portion of the first digital IF signal.

18. The apparatus of claim 17, wherein the digital down-converter comprises:
a plurality of second numerically controlled oscillators configured to generate a plurality of second digital LO signals in response to receiving the digital reference-clock signal; and
a plurality of second digital mixers, each configured to mix a respective portion of the second digital IF signal and a respective one of the plurality of second digital LO signals to generate a respective one of a plurality of digital baseband signals.

19. The apparatus of claim 17, wherein the digital up-converter further comprises:
a digital splitter configured to split the digital baseband signal into a corresponding plurality of portions; and
a plurality of weighting circuits, each configured to apply a respective weighting coefficient to the respective one of said corresponding plurality of portions to generate the respective one of the plurality of first digital baseband signals.

20. The apparatus of claim 19, wherein the digital up-converter further comprises a controller configured to set values of the respective weighting coefficients based on estimated channel-state information.

* * * * *